United States Patent [19]
James et al.

[11] Patent Number: 5,674,587
[45] Date of Patent: Oct. 7, 1997

[54] APPARATUS FOR MAKING NONWOVEN FABRICS HAVING RAISED PORTIONS

[76] Inventors: William A. James, 290 Broadway, Long Branch, N.J. 07740; William G. F. Kelly, 110 Wilton Ave., Middlesex, N.J. 08846

[21] Appl. No.: 308,017

[22] Filed: Sep. 16, 1994

[51] Int. Cl.$^6$ ............................... D04H 1/70; B32B 3/24
[52] U.S. Cl. .................... 428/131; 428/156; 428/141; 28/104; 28/105; 28/106
[58] Field of Search ................................ 428/131, 141, 428/156; 28/104, 105, 106

[56] References Cited

U.S. PATENT DOCUMENTS

| | | | |
|---|---|---|---|
| 4,995,151 | 2/1991 | Siegel et al. | 28/105 |
| 5,098,764 | 3/1992 | Drelich et al. | 428/131 |
| 5,158,819 | 10/1992 | Goodman, Jr. et al. | 428/131 |
| 5,244,711 | 9/1993 | Drelich et al. | 428/113 |

*Primary Examiner*—William Watkins

[57] ABSTRACT

A topographical support member and a method of forming a topographical support member for use in producing nonwoven fabrics with raised portions, especially intaglio and slub type portions. The topographical support member comprises a body having a top surface including a first micro-sized topographical pattern and a pattern of apertures extending through the body. At least one macro-sized region recessed below the top surface is provided. The micro-sized pattern produces a background portion of the fabric and the macro-sized recessed regions produce the raised portions of the fabric. Multiple levels may be provided in the macro-sized region to produce multiple level raised portions.

12 Claims, 17 Drawing Sheets

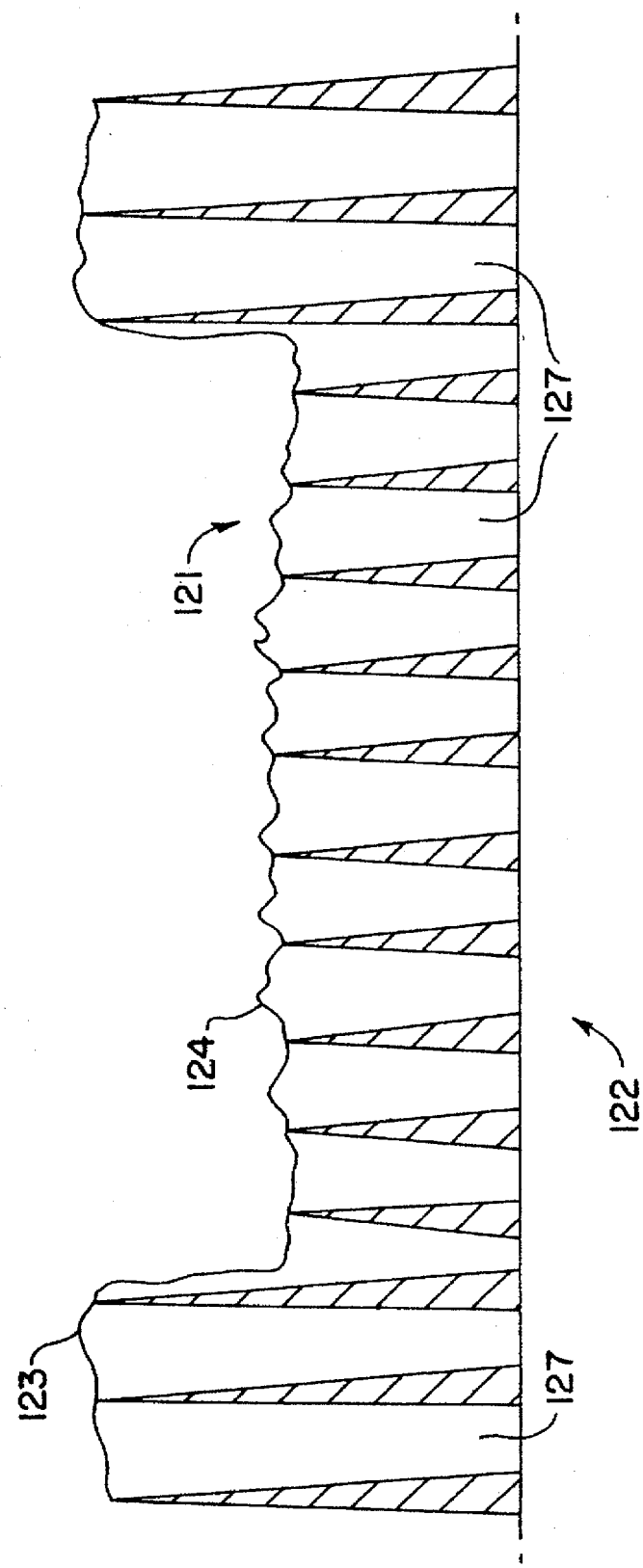

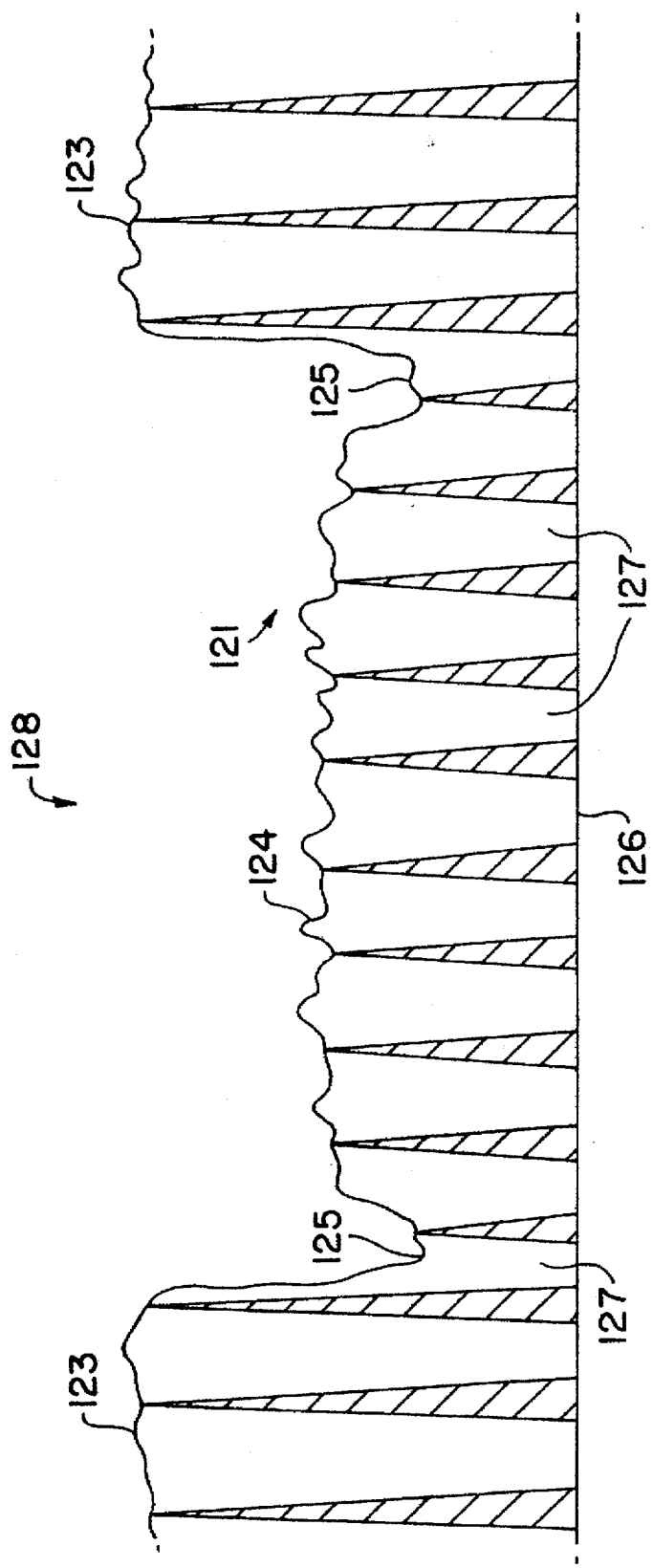

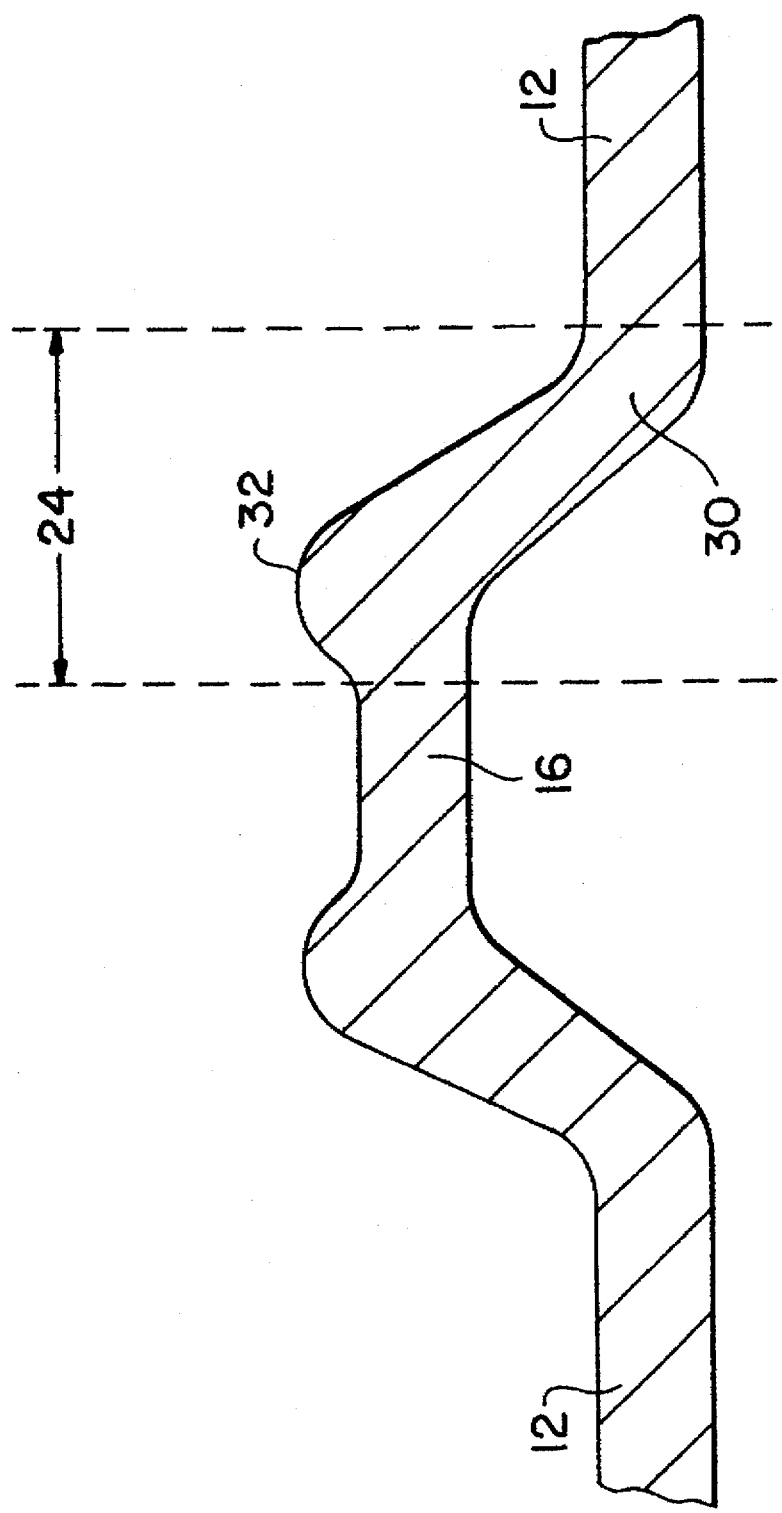

APPARATUS FOR MAKING NONWOVEN FABRICS HAVING RAISED PORTIONS

RELATED APPLICATIONS

This application is related to commonly assigned U.S. patent application Ser. No. 08/307,203, filed Sept. 16, 1994, now U.S. Pat. No. 5,585,017, entitled DEFOCUSED LASER DRILLING PROCESS FOR MAKING FABRIC FORMING DEVICE (attorney docket 9332Z), commonly assigned U.S. patent application Ser. No. 08/574,252, filed Dec. 18, 1995, pending, entitled FOCUSED RASTER SCAN DRILLING (attorney docket 9332ZY), which is a continuation-in-part application of Ser. No. 08/307,203, now U.S. Pat. No. 5,585,017, and commonly assigned U.S. patent application Ser. No. 08/308,001, filed Sep. 16, 1994, pending, entitled NONWOVEN FABRICS HAVING RAISED PORTIONS (attorney docket 9372).

BACKGROUND OF THE INVENTION

Traditional fabrics have, for centuries, been decorated and had their surface texture modified by embroidery and other needle arts. Originally, this process was obtained through tedious hand labor, painstakingly applying fine stitches that had the cumulative effect of building up a region of the background fabric according to some particular pattern. The resulting product had a base fabric, comprised of threads or yarns, woven or knitted according to some pattern, a raised region formed by a collection of threads in some stitch pattern, and an overall pattern of these raised regions determined by their respective size, shape, orientation and placement. While rich in appearance, these products were complicated to create and costly to produce.

Most nonwoven fabrics are flat and visually uninteresting. In some instances, nonwoven fabrics are embossed or printed with some sort of design to provide visual interest. In other instances, nonwoven fabrics are provided with an integral pattern during the course of their manufacture. Those having an integral pattern of their own fall into two categories:

1) Apertured fabrics—where a pattern is created by a network of bundled fiber segments surrounding apertures or holes; or
2) Weight patterned fabrics—fabrics that achieve a visual effect by concentrating fibers into regions of higher basis weight to increase opacity relative to the lower basis weight regions which are more translucent.

It is important to differentiate between basis weight and density. "Basis weight" is the weight of a unit area of fibrous web or fabric or portion thereof being characterized. Basis weight has also been called "area density" in some prior art patents. The term "density" is the weight of a unit volume of a fibrous web or fabric or portion thereof being characterized. "Density" has also been called "volume density" in some prior art patents. Typical embossing processes create regions of higher density without altering the basis weight. Traditional nonwoven patterning processes produce regions of varying basis weight, while maintaining substantially uniform density.

The prior art nonwoven fabrics made with these known patterning processes do not have clear, well defined raised portions and therefore the desired patterns are difficult to see. In addition, the raised portions of prior art embossed nonwoven fabrics are not dimensionally stable and their raised portions lose their three-dimensional structure when stressed, as for example, when they are handled or laundered.

Processes for making nonwoven fabrics have been known for many years. In one process, a fiber batt or web is treated with water streams to cause the fiber to entangle with each other and provide some strength in the batt. Many methods have been developed for treating fiber batts in this manner in an attempt to duplicate the physical properties and appearance of woven fabrics.

U.S. Pat. Nos. 5,098,764 and 5,244,711 disclose the use of a support member in one such method of producing nonwoven fabrics. The support members have a topographical feature configuration as well as an array of apertures. In this process, a starting web of fiber is positioned on the topographical support member. The support member with the fibrous web thereon is passed under jets of high pressure fluid, typically water. The jets of water cause the fiber to intertwine and interentangle with each other in a particular pattern, based on the topographical configuration of the support member.

The pattern of topographical features and apertures in the support member is critical to the structure of the resulting nonwoven fabric. In addition, the support member must have sufficient structural integrity and strength to support a fibrous web while fluid jets rearrange the fibers and entangle them in their new arrangement to provide a stable fabric. The support member must not under go any substantial distortion under the force of the fluid jets. Also, the support member must have means for removing the relatively large volumes of entangling fluid so as to prevent "flooding" of the fibrous web, which would interfere with effective entangling. Typically, the support member includes drainage apertures which must be of a sufficiently small size to maintain the integrity of the fibrous web and prevent the loss of fiber through the forming surface. In addition, the support member should be substantially free of burrs, hooks or the like irregularities that could interfere with the removal therefrom of the entangled fabric. At the same time, the support member must be such that fibers of the fibrous web being processed thereon are not washed away under the influence of the fluid jets.

SUMMARY OF THE INVENTION

The present invention is directed to topographical support members and methods of making them. These topographical support members can be used to make nonwoven fabrics having a fibrous background portion in one plane thereof and raised fibrous portions in another plane thereof. There may be two types of raised portions. The basis weight of the first type of raised portion is substantially the same as the basis weight of the background portion of the nonwoven fabric. The basis weight of the second type of raised portion is greater than the basis weight of the background portion.

On type of nonwoven fabric which can be made with support members of the present invention comprises a background portion and at least one raised portion. The background portion is located in and defines a first plane of the nonwoven fabric. The raised portion of the nonwoven fabric is located in a second plane which is above and parallel to the first plane. The raised portion is joined to the background portion by a fibrous transition region. In this specific nonwoven fabric, the basis weight of the raised portion is substantially the same as the basis weight of the background portion. The density of the background portion and the density of the raised portion are substantially the same. A raised portion whose basis weight is substantially the same as the basis weight of the background portion is sometimes referred to as an "intaglio" portion.

Another type of nonwoven fabric which can be made with support members of the present invention also comprises a background portion and at least one raised portion. As was the case with the first nonwoven fabric, the background portion is located in and defines a first plane of the nonwoven fabric and the raised portion is located in a second plane which is above and parallel to the first plane. As was the case with the first nonwoven fabric, the raised portion is joined to the background portion by a fibrous transition region. In the case of the second type of nonwoven fabric however, the basis weight of the raised portion is greater than the basis weight of the background portion. The density of the raised portion of this second nonwoven fabric is substantially the same as the density of the background portion. A raised portion whose basis weight is greater than the basis weight of the background portion is sometimes referred to as a "slub" portion.

Yet another type of nonwoven fabric which can be made with support members of the present invention, comprises a background portion, at least one first raised portion, and at least one second raised portion. As was the case with the first and second nonwovens discussed above, the background portion is located in and defines a first plane of the nonwoven fabric. The first raised portion is located in a plane which is above and parallel to the first plane. Similarly the second raised portion is located in a plane which is above and parallel to the first plane. Each of the first and second raised portions is joined to the background portion by a fibrous transition region. In this third nonwoven fabric, the basis weight of the first raised portion is substantially the same as the basis weight of the background portion, while the basis weight of the second raised portion is greater than the basis weight of the background portion. In other words, in this third type of nonwoven fabric, the nonwoven fabric has one or more first raised portions which are sometimes referred to as "intaglio" portions and one or more second raised portions which are sometimes referred to as "slub" portions. It is not necessary that the first raised portion and the second raised portion be in the same plane; rather the first raised portion may be in a plane which is above the plane of the background portion and the second raised portion may be in a plane which is above the plane of the first raised portion.

In the process of forming nonwoven fabrics using the topographical support members of the present invention, a web or layer of fibers or a lightly entangled fibrous web is placed on a foraminous forming plate or topographical support member comprising an essentially planar background surface with at least one relatively wide recessed region significantly displaced from the background surface of the forming plate. Typically, the support member comprises a multiplicity of recessed regions, positioned as depressions in some predetermined array, that will form a desired pattern of raised portions on the nonwoven fabric. Fluid forces, in the form of streams of water, are applied to the upper surface of the starting fibrous web or layer of fibers. Initially, these fluid forces "mold" the starting web to the three dimensional support member; as the process of applying fluid forces continues, the fibers are entangled and locked together so as to provide a nonwoven fabric comprising a background portion and one or more raised portions which are permanently positioned with respect to one another.

In an alternative embodiment, the topographical support member has a relatively narrow recessed region displaced from the planar background surface of the forming plate.

The present invention is directed to a topographical support member and a method for forming a topographical support member for producing nonwoven fabrics having raised portions. The support members of the present invention comprise a body portion having a top surface including a first micro-sized topographical pattern and a plurality of apertures through its thickness. The body portion further comprises at least one macro-sized region disposed below said top surface. The micro-sized pattern produces the background portion of the nonwoven fabric. The macro-sized region produces raised portions of the fabric conforming to the shape and depth of the macro-sized region. The macro-sized recessed region preferably has the same topographical pattern as the top surface of the support member, however, the regions may have a different pattern or no pattern. In addition, the macro-sized region may include a major surface recessed a first depth below the top surface and one or more minor surfaces recessed at depths different from the first depth. For example, one minor surface surrounding the major surface may be provided that is recessed at a depth below the first depth and has a diameter or a cross-sectional width substantially less than the width of the major surface.

The topographical pattern comprising the top surface of the support member is preferably produced by a laser drilling process. The laser drilling process produces a plurality of peaks, valleys and apertures in the top surface of the support members. The macro-sized regions, formed by a laser ablation process, have a cross-sectional width larger than the repeat spacing of the repeating pattern.

BRIEF DESCRIPTION OF THE DRAWINGS

FIG. 14A is a sketch in cross-section showing one type of recessed region in a topographical support member of the present invention.

FIG. 14B is a sketch in cross-section showing a different type of recessed region in a topographical support member of the present invention.

FIG. 15 is a sketch, in cross-section, of a nonwoven fabric made using the support member of FIG. 14B.

DETAILED DESCRIPTION OF THE INVENTION

Figure 1A:
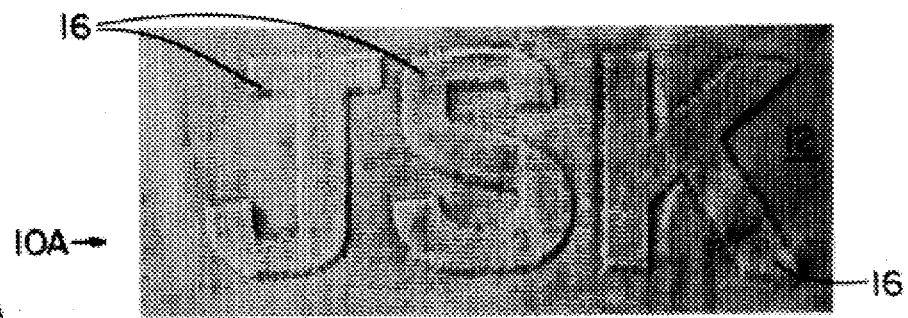
FIG. 1A is a top plan view of one nonwoven fabric which can be made using a support member of the present invention.

Referring now to the drawings, FIG. 1A is a top plan view of one nonwoven fabric which can be made using a support member of the present invention. Nonwoven fabric 10A includes a background portion 12 and at least one integrally formed raised portion 16. Three such raised portions, illustrated as the letters "J", "S" and "K", are shown in FIG. 1A. Nonwoven fabric 10 comprises a plurality of generally staple length fibers which may be, for example, cotton, rayon or polyester, or blends thereof. Background portion 12 is located in and defines a first plane of nonwoven fabric 10A. Raised portions 16 are located in a plane which is above and parallel to the first plane. Raised portions 16 are joined to the background portion 12 by a fibrous transition region which will be described in greater detail hereinafter. In nonwoven fabric 10A of FIG. 1A, the basis weight of the raised portions 16 is the same as the basis weight of the background portion 12. The density of raised portions 16 is substantially identical to the density of background portion 12.

Figure 1B:
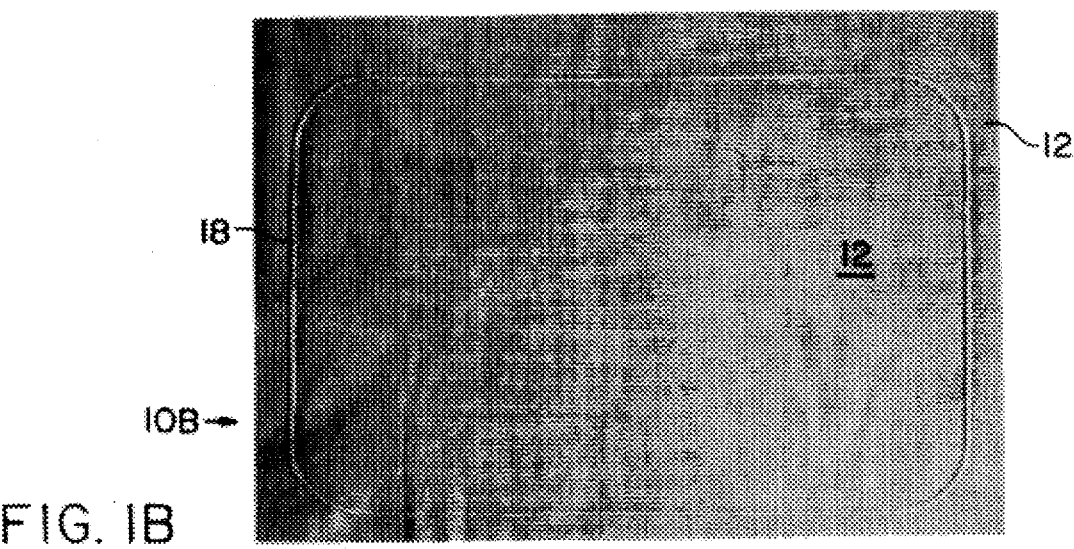
FIG. 1B is another nonwoven fabric which can be made using a support member of the present invention.

Referring now to FIG. 1B, there is illustrated another type of nonwoven fabric which can be made using a support member of the present invention. Nonwoven fabric 10B is also made of a plurality of staple length fibers and has a background portion 12 and an integrally formed raised portion 18 which, in top plan view, is generally rectangular in shape. As was the case with nonwoven fabric 10A, background portion 12 of nonwoven fabric 10B is located in and defines a first plane of nonwoven fabric 10B. As was also the case with nonwoven fabric 10A, raised portion 18 in nonwoven fabric 10B is joined to its background portion 12 by a fibrous transition region which, as mentioned above, will be described hereinafter. The basis weight of raised portion 18 in nonwoven fabric 10B is greater than the basis weight of background portion 12 to which it is joined. Thus it will be appreciated that whereas raised portions 16 comprising nonwoven fabric 10A have the same basis weight as its background portion 12, the basis weight of the raised portion 18 of nonwoven fabric 10B has a basis weight which is different from the basis weight of its background portion 12.

Figure 1C:
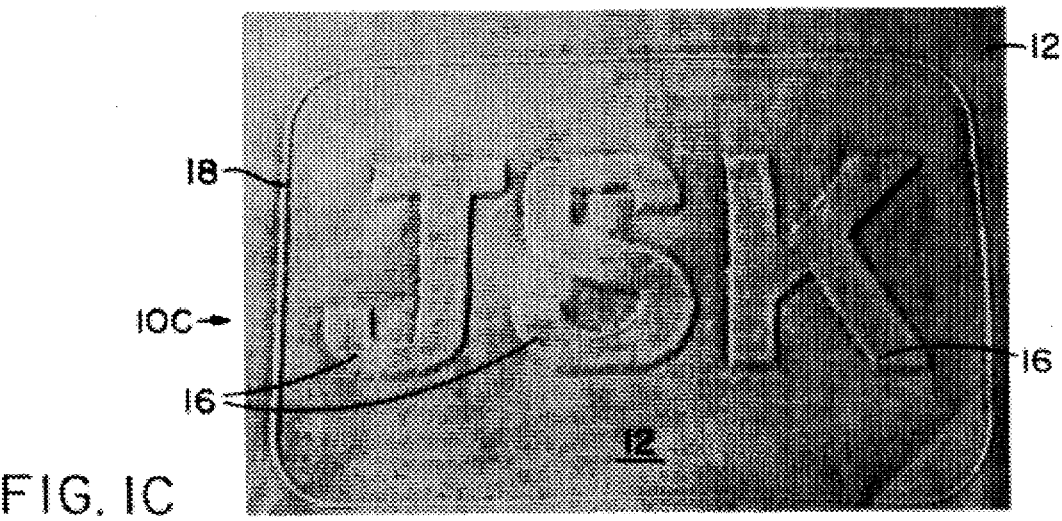
FIG. 1C is a top plan view of a third nonwoven fabric which can be made using a support member of the present invention.

Yet another nonwoven fabric which can be made using a support member of the present invention is shown in top plan view in FIG. 1C of the drawings. Nonwoven fabric 10C is made from a plurality of staple length fibers as was the case with nonwoven fabrics 10A and 10B. Nonwoven fabric 10C has a background portion 12 which is located in and defines a first plane of the nonwoven fabric and, in this respect, is the same as the earlier mentioned nonwoven fabrics. Nonwoven fabric 10C comprises first raised portions 16 shown as the letters "J", "S", and "K" in FIG. 1C. Nonwoven fabric 10C further comprises a raised portion 18, enclosing the three letters "J", "S" and "K". The raised portions 16 of nonwoven fabric 10C correspond to raised portions 16 of nonwoven fabric 10A. The raised portion 18 of nonwoven fabric 10C corresponds to raised portions 18 of nonwoven fabric 10B. It will be understood that raised portions 16 of nonwoven fabric 10C have a basis weight which is substantially identical to the basis weight of background portion 12 of the fabric. On the other hand, raised portion 18 comprising nonwoven fabric 10C has a basis weight which is greater than the basis weight of its background portion 12. In nonwoven fabric 10C, the background portion 12, the first raised portions 16, and the second raised portion 18, have substantially identical densities.

Background portions 12 of nonwoven fabrics 10A, 10B and 10C are the same in each instance. This background portion 12 has a tricot-like pattern and appearance but it will be understood that the background portion may have different patterns and appearances. In the specific case of nonwoven fabric 10A, raised portions 16 and background portion 12 have the same tricot-like pattern and appearance. Similarly, the raised portion 18 of nonwoven fabric 10B has the same tricot-like appearance as background portion 12. Finally, background portion 12, first raised portions 16, and second raised portion 18 comprising nonwoven fabric 10C all have the same tricot-like pattern and appearance. It should be understood, however, that first raised portions 16, second raised portion 18 and background portion 12 of nonwoven fabric 10C may have differing patterns and appearances.

Figure 2:
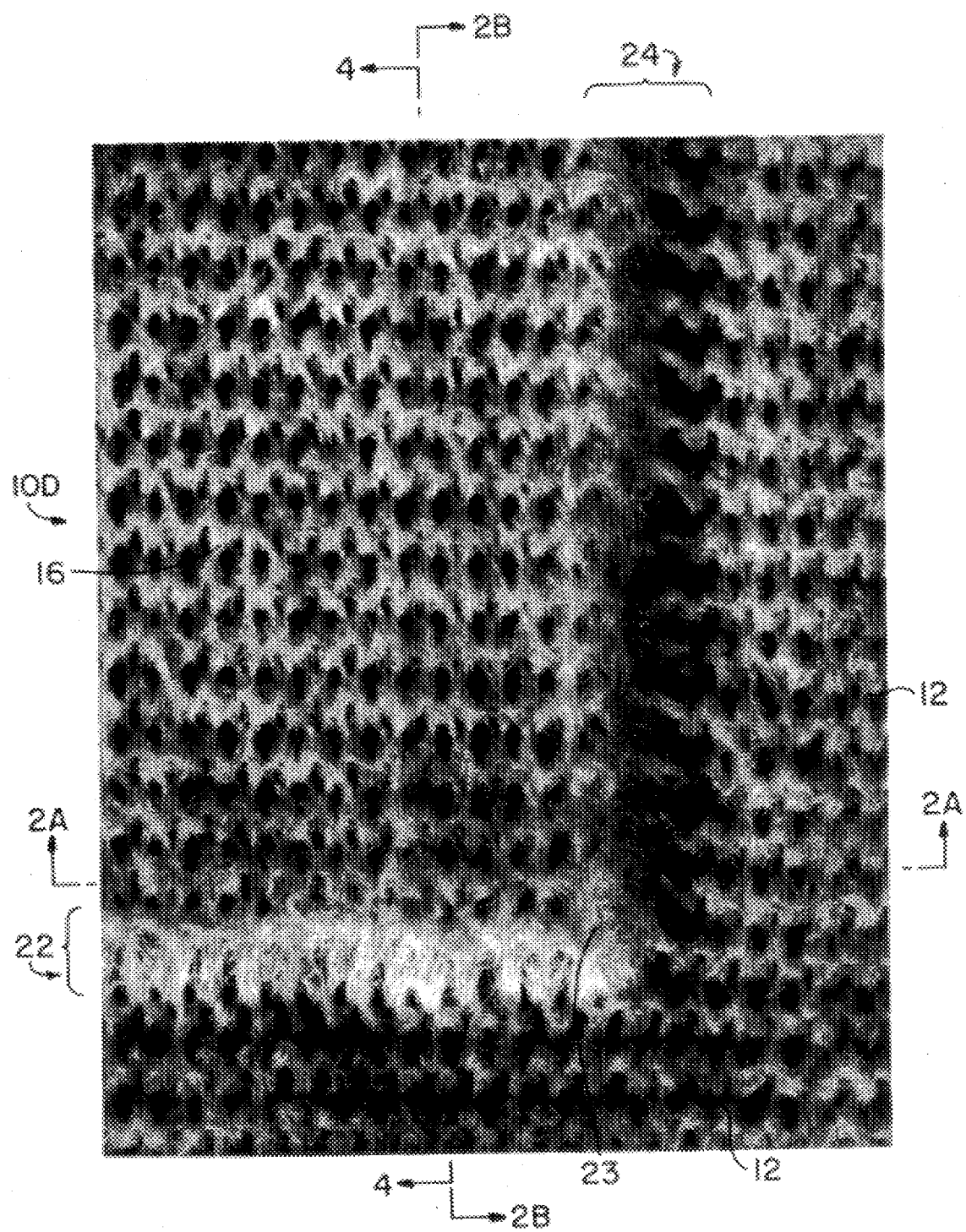
FIG. 2 is a photomicrograph, in plan view, of a portion of a nonwoven fabric made using a support member of the present invention.

FIG. 2 is a photomicrograph at 15× magnification and in top plan view of a portion of a nonwoven fabric 10D which is similar to nonwoven fabric 10A of FIG. 1A. Nonwoven fabric 10D comprises a tricot-like background portion 12 and a raised portion 16 which also has a tricot-like pattern. It will be understood that only a portion of raised fibrous portion 16 is seen in FIG. 2. Raised portion 16 is joined to background portion 12 by fibrous transition regions 22 and 24. As can be seen by reference to FIG. 2, fibrous transition region 22 runs in the horizontal direction on one side of raised portion 16, said horizontal direction being the cross-machine direction of nonwoven fabric 10D. Fibrous transition region 24 runs in the longitudinal direction on another side of raised portion 16, said longitudinal direction being the machine direction of nonwoven fabric 10D. Fibrous transition region 22 meets fibrous transition region 24 at an angle of about 90° at a corner 23 of raised portion 16. The fibrous structures of transition regions 22 and 24 are substantially the same. As mentioned earlier herein, the basis weight of raised portion 16 is substantially the same as the basis weight of background portion 12.

Figure 2A:
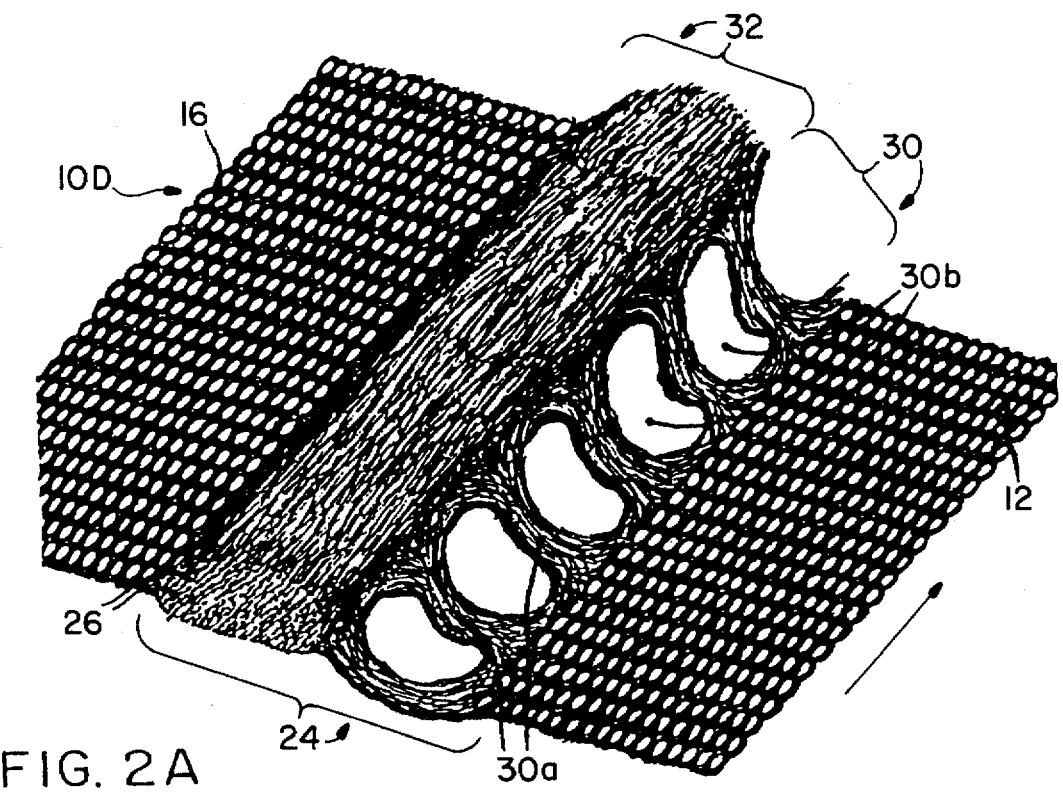
FIG. 2A is a perspective view of the cross-sectional view taken along line 2A—2A of FIG. 2.

FIG. 2A is a sketch showing nonwoven fabric 10D, a photomicrograph of the top surface of which is shown in FIG. 2. FIG. 2A, which is presented in order to assist in the understanding of the fibrous structure of nonwoven fabric 10D, is a perspective view of the cross-section taken along line 2A—2A of FIG. 2. Referring to FIG. 2A, nonwoven fabric 10D has a fibrous background portion 12 and a fibrous raised portion 16, each of which is formed in a tricot-like pattern. Raised portion 16 is joined to background portion 12 by a fibrous transition region 24 which extends in the machine direction of fabric 10D. Fibrous transition region 24 comprises a fiber-poor region 30 and a fiber-rich region 32. Fiber-poor region 30 comprises a plurality of bundles 30a of fiber segments and these bundles 30a define a plurality of apertures 30b in transition region 24. The fiber segments comprising bundles 30a are highly parallelized and some of these fiber segments are in a twisted configuration within the bundle. A majority of the bundles 30a are twisted and turned upon themselves.

Fiber-rich region 32 comprises a plurality of fiber segments which extend predominantly in the vertical direction of FIG. 2 which corresponds to the machine direction of nonwoven fabric 10D. The ends of these fiber segments can be seen in FIG. 2A where they are identified by numeral 26. The basis weight of fiber-poor region 30 is less than the basis weight of fiber-rich region 32 and is also less than the basis weight of both background portion 12 and raised portion 16. The basis weight of fiber-rich region 32 is greater than the basis weight of both background portion 12 and raised portion 16. Bundles 30a in the fiber-poor region 30 are oriented generally transversely of fibrous transition region 24. The fiber segments comprising the fiber-rich region 32 are oriented generally longitudinally of transition region 24.

Figure 2B:
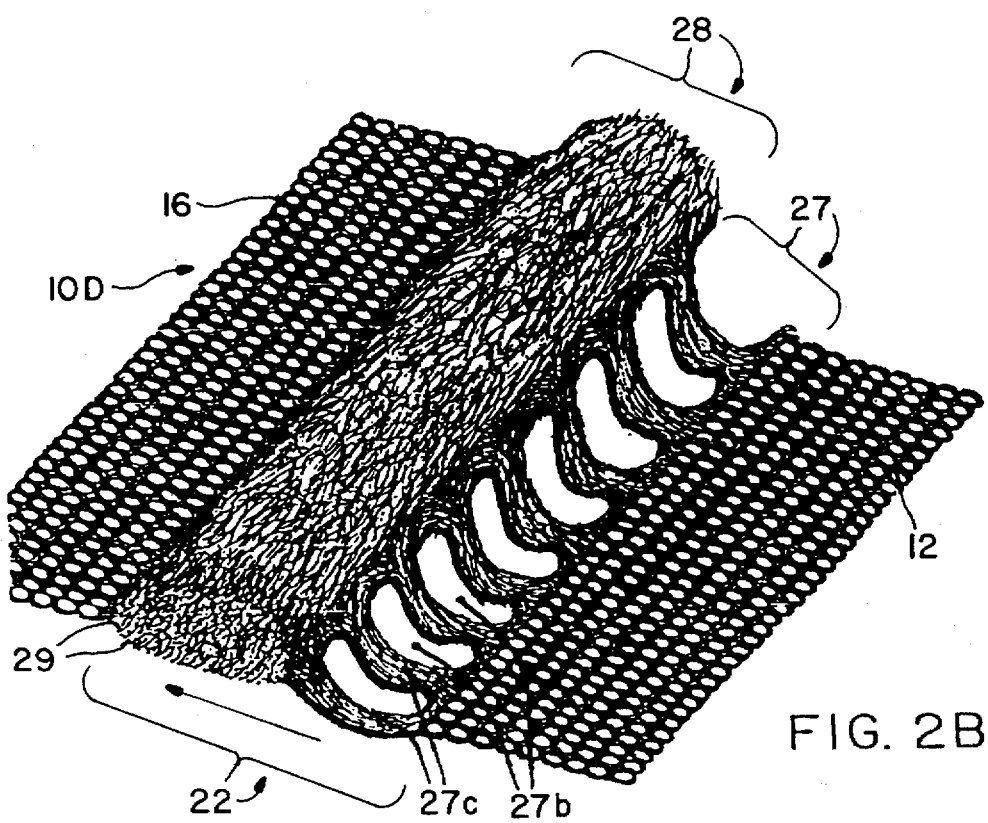
FIG. 2B is a perspective view of the cross-sectional view taken along line 2B—2B of FIG. 2.

FIG. 2B is another sketch showing nonwoven fabric 10D. FIG. 2B is a perspective view of the cross-section taken along line 4—4 of FIG. 2. Referring to FIG. 2B, raised portion 16 is joined to background portion 12 by a fibrous transition region 22 which extends in the cross machine direction of fabric 10D. Transition region 22 comprises a fiber-poor region 27 and a fiber-rich region 28 analogous, respectively, to fiber-poor region 30 and fiber-rich region 32 of fibrous transition region 24 discussed above. Fiber-poor region 27 comprises a plurality of bundles 27a of fiber segments and these bundles 27a define a plurality of apertures 27b in transition region 22. The fiber segments comprising bundles 27a are very highly parallelized and some of these fiber segments are in a twisted configuration within the bundle. A minority of the bundles 27a are twisted and turned upon themselves. This is in contrast to the structure of fiber-poor region 30 of transition region 24 previously discussed in which a majority of bundles 30a are twisted and turned upon themselves. Fiber-rich region 28 comprises a plurality of fiber segments which extend predominantly in the horizontal direction of FIG. 2 which corresponds to the cross-machine direction of nonwoven fabric 10D. The ends of these fiber segments can be seen in FIG. 2A where they are identified by numeral 29. The basis weight of fiber-poor region 27 is less than the basis weight of fiber-rich region 28 and is also less than the basis weight of both background portion 12 and raised portion 16. The basis weight of fiber-rich region 28 is greater than the basis weight of both background portion 12 and raised portion 16. Bundles 27a in the fiber-poor region 27 are oriented generally transversely of fibrous transition region 22. The fiber segments comprising the fiber-rich region 28 are oriented generally longitudinally of transition region 22.

Figure 3:
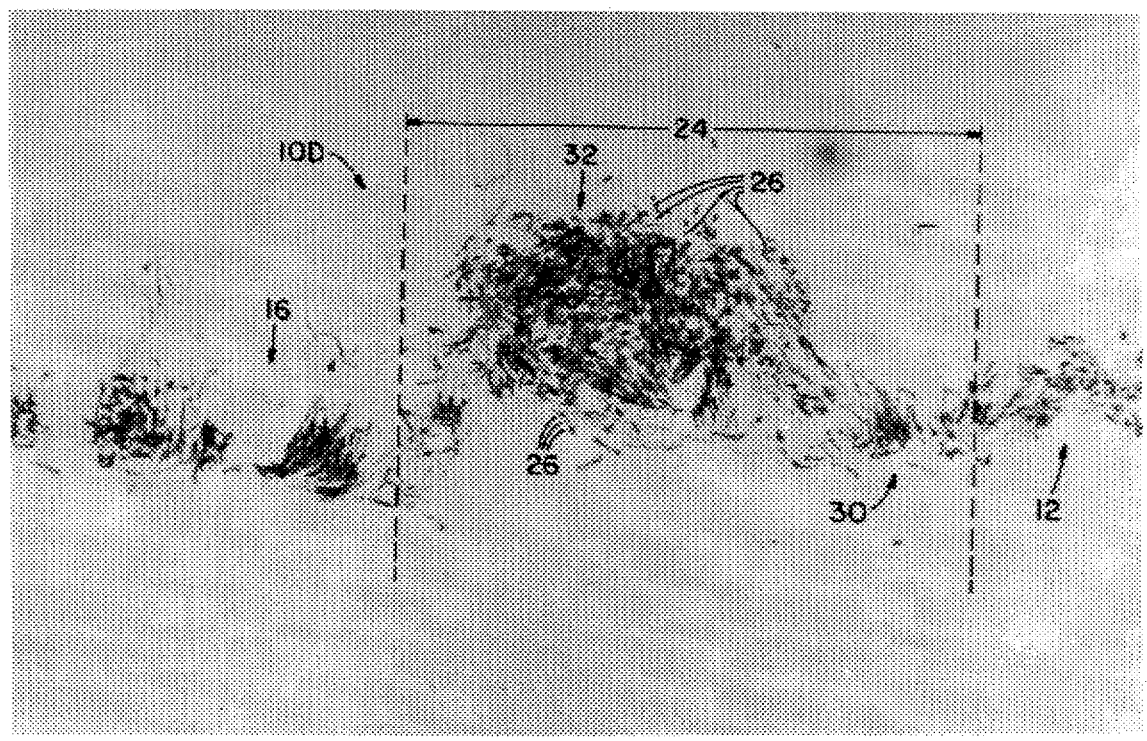
FIG. 3 is a photomicrograph of a cross-sectional view taken along Line 2A—2A of FIG. 2.

FIG. 3 is a photomicrograph of nonwoven fabric 10D taken along line 2A—2A of FIG. 2. FIG. 3 shows raised portion 16 joined to background portion 12 by transition region 24. The fiber-rich region 32 is seen adjacent fiber-poor region 30. The large number of fiber ends 26 in fiber-rich region 32 demonstrates the high level of parallelism of the fiber segments in the fiber-rich region.

Figure 4:
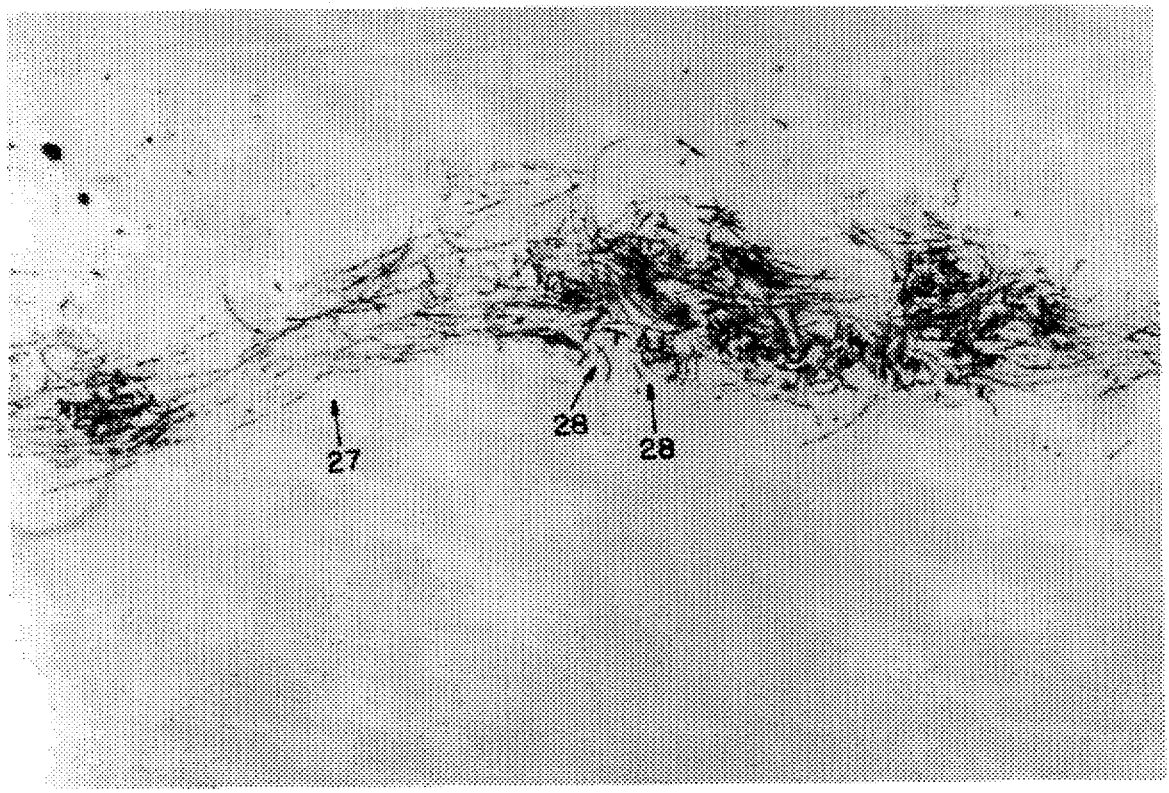
FIG. 4 is a photomicrograph of a cross-sectional view taken along Line 4—4 of FIG. 2.

FIG. 4 is a photomicrograph of fibrous transition region 22 of nonwoven fabric 10D taken along line 4—4 of FIG. 2. Numeral 28 indicates the fiber-rich region of transition region 22, while numeral 27 indicates the fiber-poor region. It can be seen that the fiber segments in fiber-poor region 27 are highly parallelized. In general, there is less parallelism of fibers in fiber-rich region 28 than there is in the corresponding region 32 shown in FIG. 3.

Figure 5:
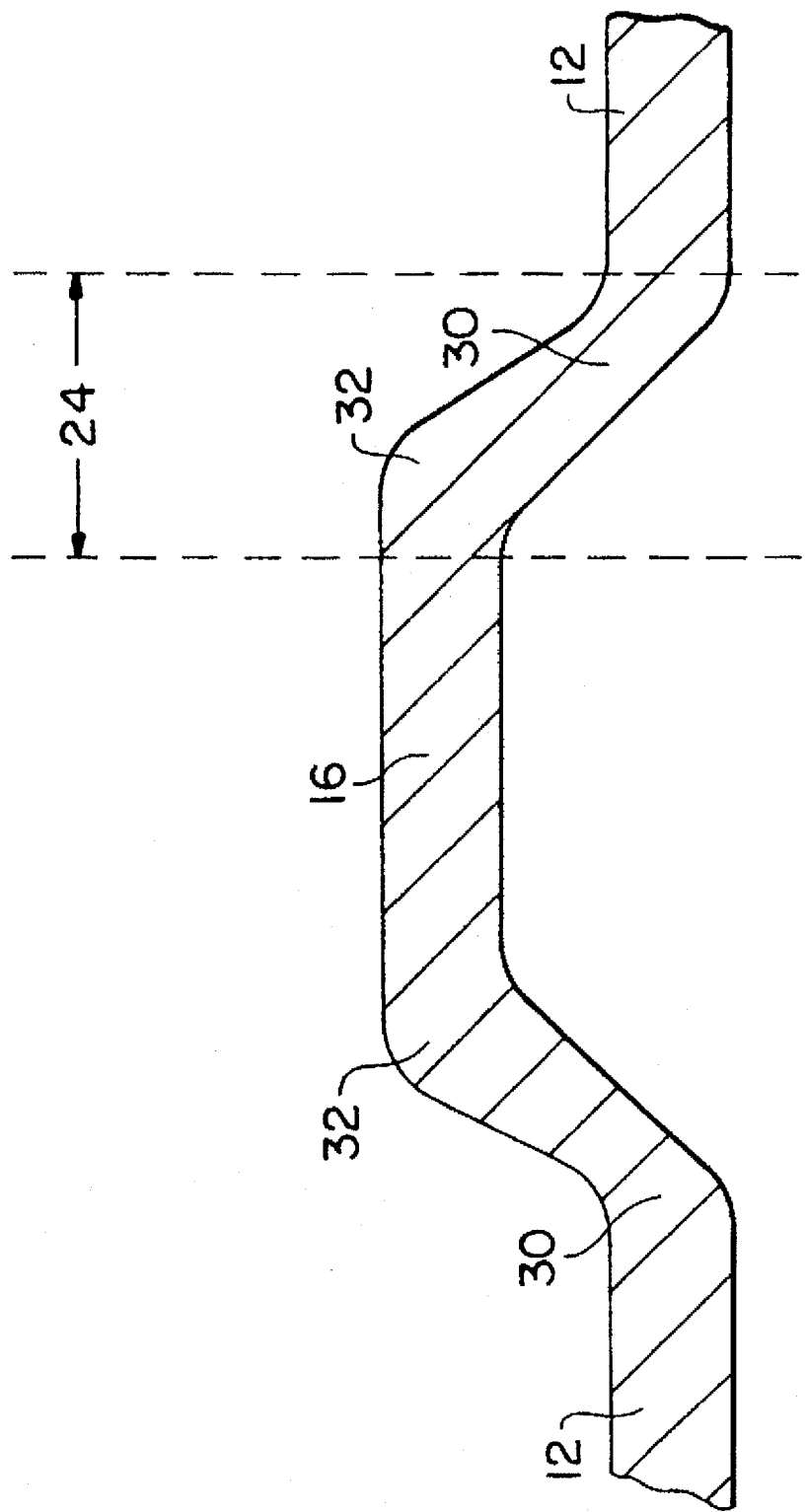
FIG. 5 is a cross-sectional view, greatly enlarged, of one type of raised portion in a nonwoven fabric made with a support member of the present invention.

FIG. 5 is an artistic representation of a cross-sectional view showing raised portion 16 joined to background portion 12 by transition region 24. Transition region 24 comprises a fiber-poor region 30 and a fiber-rich region 32. As mentioned earlier, fiber-rich region 32 has a higher basis weight than fiber-poor region 30. The basis weight of raised portion 16 lying between fiber-rich regions 32 in FIG. 5 is substantially uniform and is substantially equal to the basis weight of background portion 12.

Figure 6:
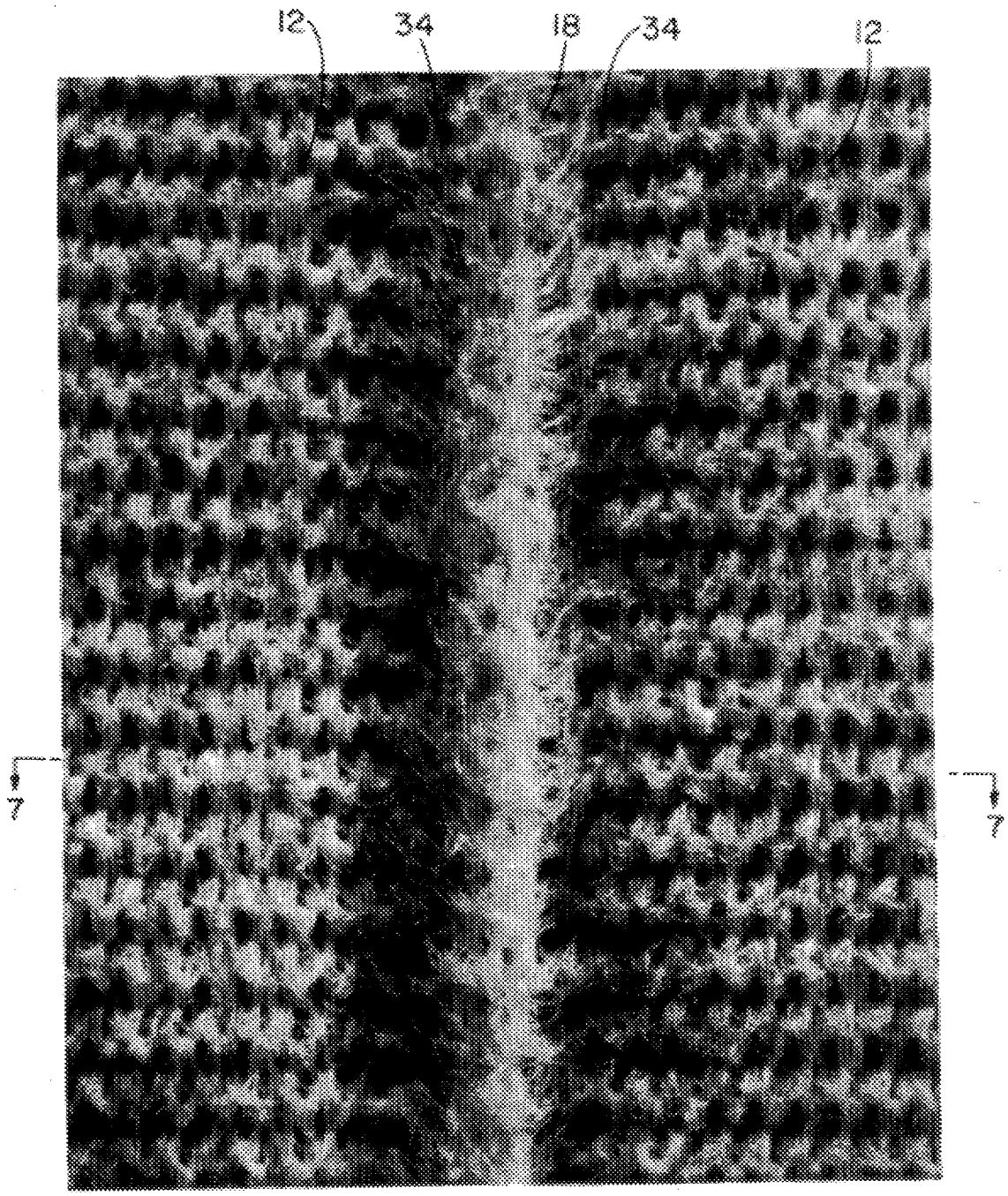
FIG. 6 is a photomicrograph, in plan view, of a second type of raised portion in a nonwoven fabric made with a support member of the present invention.

FIG. 6 is a photomicrograph enlargement in plan view of a nonwoven fabric similar to nonwoven fabric 10B of FIG. 1B. The background portion 12, on either side of the raised portion 18 has a tricot-like micro-sized pattern. In this embodiment, the tricot-like pattern is also present on the top surface of raised portion 18. The fibers comprising raised portion 18 are in bundles that are twisted and turned upon each other and are substantially parallel to each other in the longitudinal direction of the raised portion.

As indicated earlier herein, the basis weight of raised portion 18 is greater than the basis weight of background portion 12. The density of raised portion 18 is substantially equal to the density of background portion 12. Raised portion 18 is connected to background portion 12 by a fibrous transition region 34 which has a lower basis weight than the basis weight of background portion 12.

Figure 7:
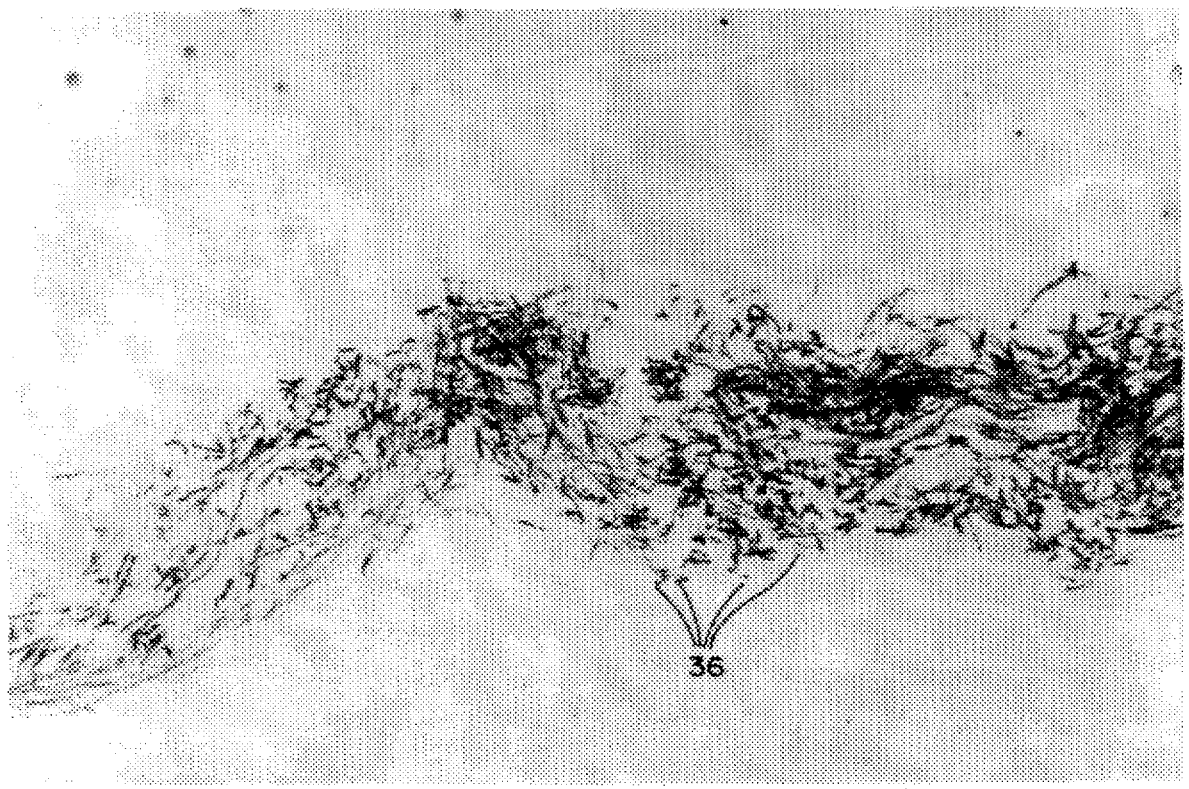
FIG. 7 is a photomicrograph of a cross-sectional view taken along Line 7—7 of FIG. 6.

FIG. 7 is a photomicrograph of the nonwoven fabric of FIG. 6 taken along line 7—7 of FIG. 6. The large number of fiber ends 36 seen in raised portion 18 demonstrates that the fiber segments in the raised portion 18 extend in the longitudinal direction of the raised portion.

Figure 8:
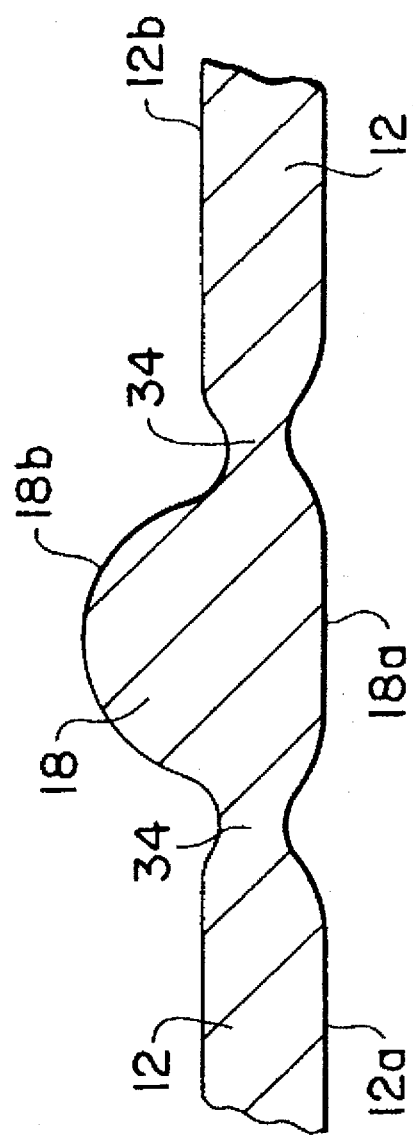
FIG. 8 is an idealized sketch of the cross-sectional view shown in FIG. 7.

FIG. 8 is an artistic representation of a cross-sectional view showing raised portion 18 joined to background portion 12 by transition region 34. It will be seen that the bottom surface 18a of raised portion 18 is essentially co-planar with the bottom surface 12a of background portion 12. The uppermost surface 18b of raised portion 18 extends above the upper surface 12b of background portion 12.

Figure 9:
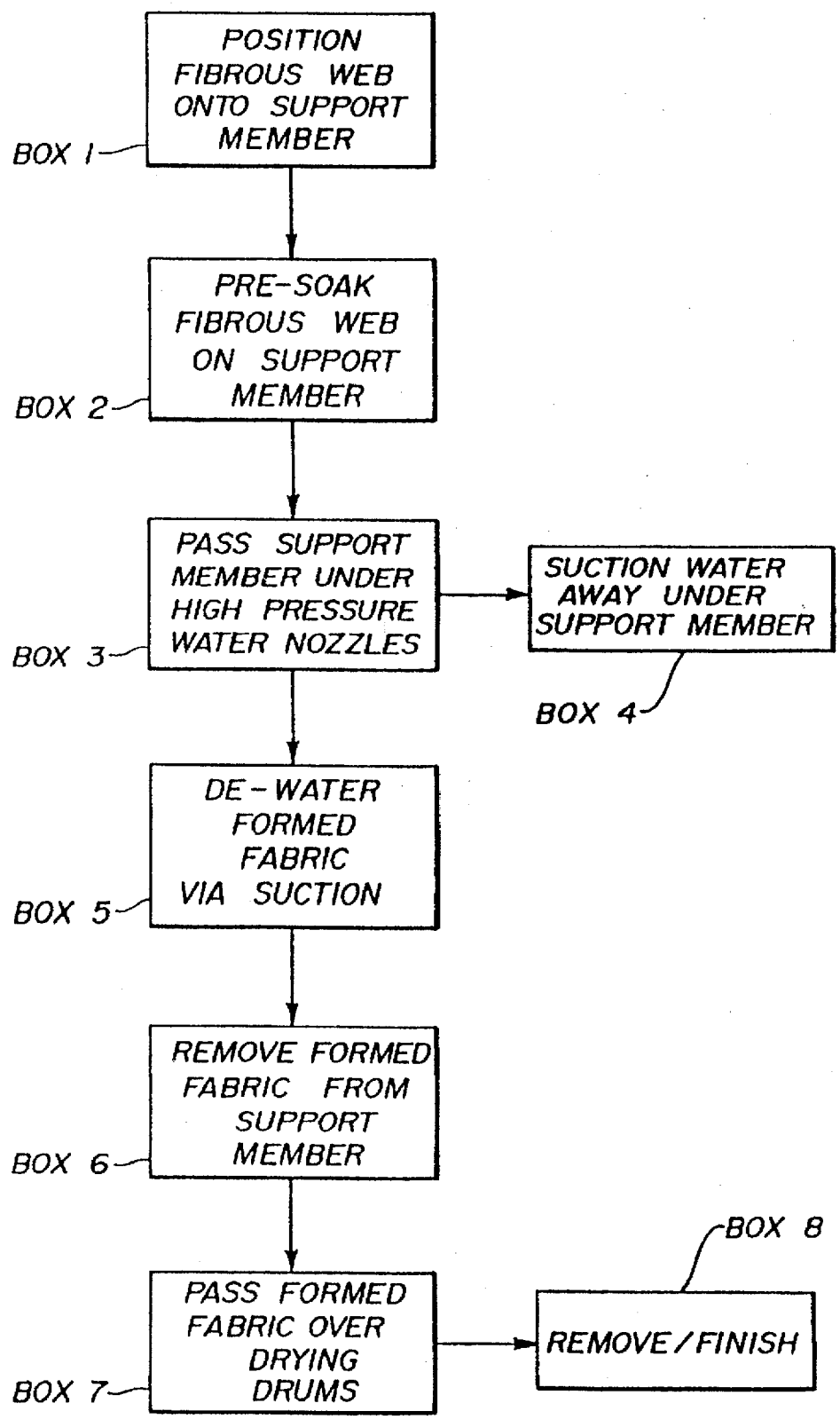
FIG. 9 is a block diagram of the steps of the process for making nonwoven fabrics using support members of the present invention.

FIG. 9 is a block diagram showing the various steps in the process of producing nonwoven fabrics using a support member of the present invention. The first step in this process is to position a web of fibers on a topographical support member (Box 1). The fibrous web is presoaked or wetted out with water while on this support member (Box 2) to ensure that as it is being treated it will remain on the support member. The support member with the fibrous web thereon is passed under a series of orifices from each of which a fluid, such as water, is ejected under high pressure and directed toward the upper surface of the fibrous web, i.e., that surface of the web which is out of contact with the topographical support member (Box 3). The preferred fluid is water. The water is transported away from the support member, preferably using a vacuum (Box 4). The fibrous web is de-watered (Box 5). The de-watered formed fabric is removed from the support member (Box 6). The formed fabric is passed over a series of drying drums to dry the fabric (Box 7). The fabric may then be finished or otherwise processed as desired (Box 8).

Figure 10:
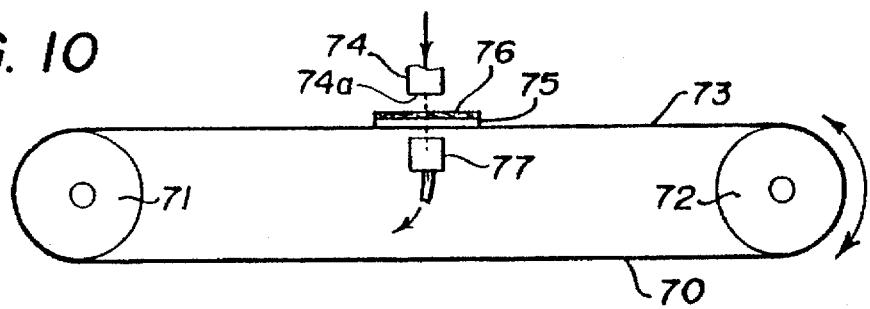
FIGS. 10, 11 and 12 are diagrammatic views of three types of apparatus for producing nonwoven fabrics using support members of the present invention.

FIG. 10 is a schematic representation of one type of apparatus for producing nonwoven fabrics using support members of the present invention. In this apparatus, a foraminous conveyor belt 70 moves continuously about two spaced apart rotatable rolls 71 and 72. The belt is driven so that it can be reciprocated or moved in either a clockwise or counterclockwise direction. A water ejecting manifold 74 is placed above the upper reach 73 of belt 70. This manifold has a plurality of very fine diameter holes or orifices. The diameter of the orifices is about 0.007 inch and there are about 30 such holes per lineal inch. Water is supplied to manifold 74 under pressure and is ejected from the orifices in the form of substantially columnar, non-diverging jets or streams. A topographical support member 75 is placed on top of belt 70 and a web 76 of fibers is placed on top of the topographical support member. A suction manifold 77 is placed directly beneath water manifold 74, but under upper reach 73 of belt 70. This suction manifold aids in removing the water ejected from manifold 74 so as to prevent flooding of fibrous web 76. Water delivered to the manifold at a predetermined pressure is ejected from the orifices of the manifold in the form of substantially columnar streams or jets and impinges on the upper surface of fibrous web 76. The distance from the lower surface 74a of manifold 74 to the upper surface of web 76 to be processed is sufficiently small so as to insure that the water jets which issue from the orifices of manifold 74 contact the upper surface of fibrous web 76 in the aforementioned substantially columnar, non-diverging form. This distance may vary but typically is about 0.75 inch. The water jets pass through the fibrous web, then through drain holes provided in the topographical support member. Spent processing water is removed through the suction manifold. As may be appreciated, the topographical support member with the fibrous web thereon may be passed under the manifold a number of times as desired to produce fabrics in accordance with the present invention.

Figure 11:
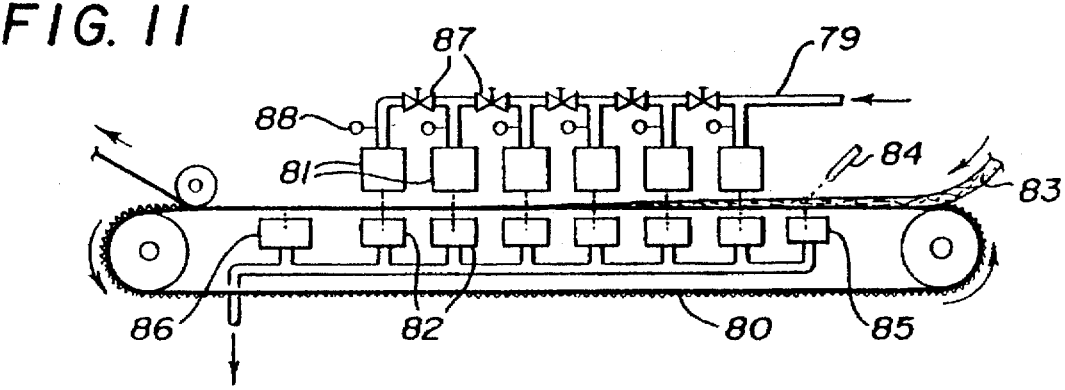

FIG. 11 depicts an apparatus for continuously producing nonwoven fabrics using support members in accordance with the present invention. The apparatus of FIG. 11 includes a conveyor belt 80 which actually serves as the topographical support member in accordance with the present invention. The belt is continuously moved in a counterclockwise direction about a pair of spaced-apart rollers as is well known in the art. Disposed above belt 80 is a fluid ejecting manifold 79 connecting a plurality of lines or groups 81 of orifices. Each group has one or more rows of very fine diameter orifices, each about 0.007 inch in diameter with 30 such orifices per inch. Water is supplied to the groups 81 of orifices under a predetermined pressure and is ejected from the orifices in the form of very fine, substantially columnar, non-diverging streams or jets of water. The manifold is equipped with pressure gauges 88 and control valves 87 for regulating the fluid pressure in each line or group of orifices. Disposed beneath each orifice line or group is a suction box 82 for removing excess water, and to keep the area from undue flooding. The fiber web 83 to be formed into the fabric of the present invention is fed to the topographical support member conveyor belt. Water is sprayed through an appropriate nozzle 84 onto the fibrous web to pre-wet the incoming web 83 and aid in controlling the fibers as they pass under the fluid ejecting manifolds. A suction slot 85 is placed beneath this water nozzle to remove excess water. Fibrous web passes under the fluid ejecting manifold in a counter clockwise direction. The pressure at which any given group 81 of orifices is operated can be set independently from the pressure at which any of the other groups 81 of orifices is operated. Typically, however, the group 81 of orifices nearest spray nozzle 84 is operated at a relatively low pressure, e.g. 100 psi. This assists in settling the incoming web onto the surface of the support member. As the web passes in the counterclockwise direction in FIG. 11, the pressures at which the groups 81 of orifices are operated is usually increased. It is not necessary that each succeeding group 81 of orifices be operated at a pressure higher than its neighbor in the clockwise direction. For example, two or more adjacent groups 81 of orifices could be operated at the same pressure, after which the next succeeding group 81 of orifices (in the counterclockwise direction) could be operated at a different pressure. Very typically, the operating pressures at the end of the conveyor belt where the web is removed are higher than the operating pressures where the web is initially fed into the conveyor belt. Though six groups 81 of orifices are shown in FIG. 11, this number is not critical, but will depend on the weight of the web, the speed, the pressures used, the number of rows of holes in each group, etc. After passing between the fluid ejecting manifold and the suction manifolds, the now formed nonwoven fabric is passed over an additional suction slot 86 to remove excess water. The distance from the lower surfaces of the groups 81 of orifices to the upper surface of fibrous web 83 typically ranges from about 0.5 inch to about 2.0 inches; a range of about 0.75 inch to about 1.0 inch is preferred. It will be apparent that the web cannot be spaced so closely to the manifold that the web contacts the manifold. On the other hand, if the distance between the lower surfaces of the orifices and the upper surface of the web is too great, the fluid streams will lose energy and the process will be less efficient.

Figure 12:
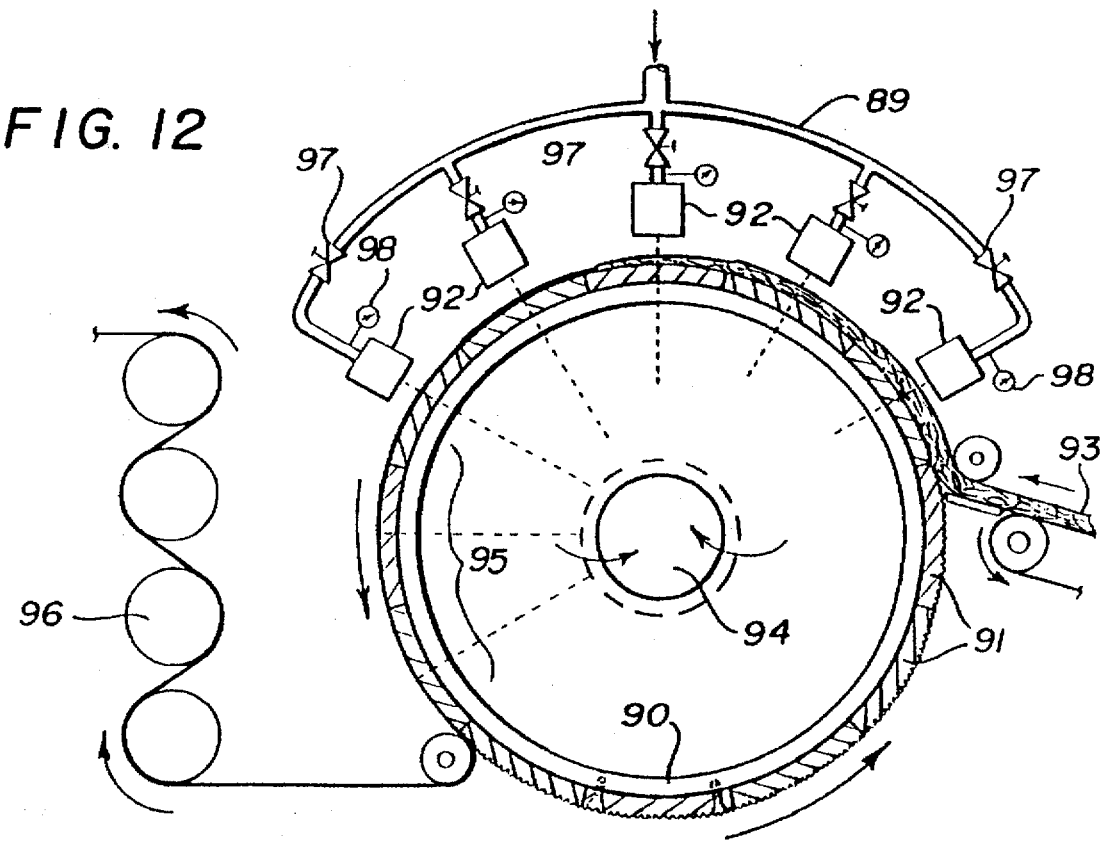

A preferred apparatus for producing nonwoven fabrics using support members of the present invention is schematically depicted in FIG. 12. In this apparatus, the topographical support member is a rotatable drum 90. The drum rotates in a counterclockwise direction. Drum 90 may be a continuous cylindrical drum or may be made of a plurality of curved plates 91, disposed so as to form the outer surface of the drum. In either case, the outer surface of the drum 90 or the outer surfaces of the curved plates 91 comprises the desired topographical support configuration. Disposed about a portion of the periphery of the drum is a manifold 89 connecting a plurality of orifice strips 92 for applying water or other fluid to a fibrous web 93 placed on the outside surface of the curved plates. Each orifice strip may comprise one or more rows of very fine diameter holes or apertures of the type mentioned earlier herein. Typically, the apertures are approximately $5/1000$ of an inch to $10/1000$ of an inch in diameter. There may be as many as 50 or 60 holes per inch or more if desired. Water or other fluid is directed through the rows of orifices. In general, and as explained above, the pressure in each orifice group is typically increased from the first group under which the fibrous web passes to the last group. The pressure is controlled by appropriate control valves 97 and is monitored by pressure gauges 98. The drum is connected to a sump 94 on which a vacuum may be pulled to aid in removing water and to keep the area from flooding. In operation, the fibrous web 93 is placed on the upper surface of the topographical support member before the water ejecting manifold 89 as seen in FIG. 12. The fibrous web passes underneath the orifice strips and is formed into a nonwoven fabric in accordance with the present invention. The formed fabric is then passed over a section 95 of the apparatus 95 where there are no orifice strips, but vacuum is continued to be applied. The fabric after being de-watered is removed from the drum and passed around a series of dry cans 96 to dry the fabric.

In order to create the raised portions in nonwoven fabrics, a layer of fibers or a lightly entangled web is placed on a foraminous support member comprising a top surface having a topographical pattern and a second surface displaced from the top surface of the support member. The top surface creates the background portion and the second surface creates the raised portion of the fabric.

The top surface has a structure which minimizes lateral movement of the fibers of the starting fibrous web that would undesirably create areas of high and low fiber concentration. If there is excessive lateral movement of the fibers during processing, the resulting nonwoven fabric may have thin spots or regions devoid of fibers.

Figure 13:
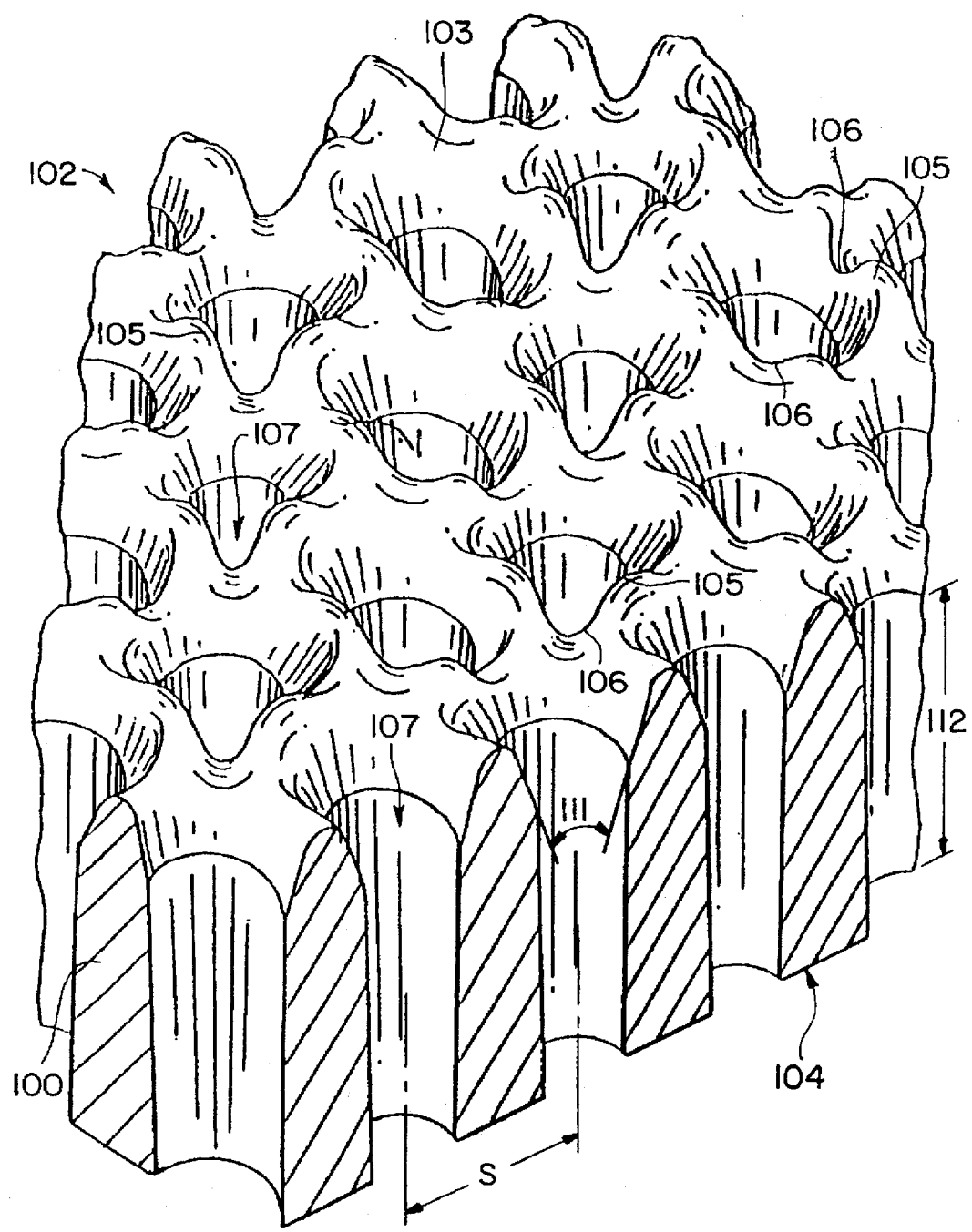
FIG. 13 is a perspective view, with parts in cross-section, of that portion of a topographical support member used to produce one background portion of a nonwoven fabric.

An example of a topographical support member for making a pattern in the background portion of a nonwoven fabric is shown in FIG. 13. The support member 102 comprises a body 100 having a top surface 103 and bottom surface 104. Disposed in a predetermined pattern across top surface 103 is an array of peaks 105 separated by valleys 106. A plurality of drainage apertures 107 extends through the thickness of the support member are disposed in a pattern in the member 102. In this embodiment, each drainage aperture 107 is surrounded by a cluster of six peaks 105 and six valleys 106.

The drainage apertures 107 are tapered, or "bell mouthed", having a larger diameter at the top surface 103 of the support member than the bottom surface 104. The angle 111 formed by the taper must be controlled relative to the thickness 112 of the support member 102 to produce the intended result. For example, if the angle is too great, the aperture will be too small and therefore insufficient drainage will be provided. If the angle is too small, there will be very few or no peaks and valleys in the support member.

The center-to-center spacing, S, of adjacent apertures in the repeating pattern is of similar importance. The peaks 105 and valleys 106 are created by the intersection of the tapered, somewhat conical apertures 107. If the center-to-center spacing, S, of the apertures were greater than the major diameter of aperture 107 at the top surface 3, no intersection would result, and the member would be a smooth, flat top surface with conical apertures disposed throughout. When the center-to-center spacing of adjacent apertures is less than the aperture diameters measured along that center-to-center line, the conical surfaces intersect forming a valley. The support member of FIG. 13 will produce a tricot-like pattern in the background portion of a nonwoven fabric. Any pattern may be employed to form the design of the background portion of the nonwoven fabric.

The second surface of the foraminous support member is comprised of a plurality of recesses that will create the raised portions in the final fabric. FIG. 14A is a cross-sectional view of a support member 122 having a top surface 123 and a recessed region 121 comprising second surface 124. Apertures 127 are approximately normal to the support member, and extend fully from the top surface 103 to the bottom surface 104. The apertures must be of adequate size and number to remove the excess fluid during entangling and prevent "excessive flooding" of the support member surface during entangling.

It will be apparent to one skilled in the art that recessed region 121 must be of sufficient size so as to provide a clearly defined raised portion in the finished nonwoven fabric. For example, the specific support member 102 shown in FIG. 13 has a repeating pattern comprising a single aperture 107 surrounded by six peaks 105. Apertures 107 in member 102 have a center line-to-center line spacing of S. The narrowest dimension of recessed region 121 must be greater than the center line-to-center line spacing, S. If the narrowest dimension of recessed region 121 is less than center line-to-center line spacing S, the raised region will not be well defined or may not exist at all in the final nonwoven fabric. In a specific embodiment of support member 122, which has been used to make nonwoven fabrics of the present invention, the width of the recessed region 121 is about 11 times the center line-to-center line spacing, S, of apertures 107. The recessed surfaces should be deep enough to be clearly discernable as a different level, may have multiple levels, and may be curved as well as planar. The recessed second surface 121 of member 122 may have the same pattern as top surface 123, or a different pattern.

The top surface of the support member is provided with sufficient texture to control the movement of fibers, preventing "washed out" areas yet allowing sufficient mobility for the web of fibers to arrange themselves in the recesses and interlock under the influence of the fluid jets. With an appropriately aggressive pattern of holes, no additional texture is required. Usually, however, some texture is created in this surface to provide better control of fiber movement and impart visual interest to the final fabric.

A transition region is evident between the two levels. A thinning of the fiber concentration at the edge of the background occurs, with a corresponding increase in fiber concentration near the edge of the raised portion. With a sample fabric averaging 2.19 oz./sq. yd., strips of fabric 7/64" wide by ½" long were cut with the long dimension parallel to the transition line, centered in the areas of highest and lowest fiber concentration. The weight ratio of heavy strips to light strips for four different patterns averaged 1.53:1. The result is that a wide feature has a background portion basis weight about equal to the raised portion basis weight, but with this rather poorly defined transition having light and heavy areas. To remedy this for larger features, the preferred embodiment will have three or more distinct, essentially parallel surfaces, each at a different layer in the thickness of the backing member.

FIG. 14B shows a cross section of a topographical support member 128 with top surface 123, recessed region 121, recessed surface 124, a second recessed region 125, and bottom surface 126. Apertures 127 extend through the entire thickness of the support member.

A nonwoven fabric made using support member 122 comprises a background portion 12, a raised portion 16 and a transition region 24 comprising a fiber-poor region 30 and a fiber-rich region 32. The fiber-rich region 32 of transition region 24 lies adjacent and is connected to the periphery of raised portion 16. In this nonwoven fabric, there is a distinct and visually apparent boundary between the fiber-poor region 30 and the background portion 12. However, the boundary between the fiber-rich region 32 and the periphery of the raised portion 16 is less distinct and less visually apparent. This latter boundary can be made more distinct and more visually apparent by using the topographical support member shown in FIG. 14B to make the nonwoven fabric. As seen in FIG. 14B, topographical support member 128 comprises a top surface 123, a recessed surface 124, a pair of second recessed regions 125, a bottom surface 126 and a plurality of apertures 127 extending through its thickness. A nonwoven fabric made with topographical support member 128 is shown in cross-section in FIG. 15 of the drawings. There it will be seen that the nonwoven fabric comprises a background portion 12, a raised portion 16 and a fibrous transition region 24 which joins the background portion and the raised portion. Transition region 24 comprises a fiber-poor region 30 and a fiber-rich region 32 analogous to those seen in FIG. 5. Whereas in the nonwoven fabric of FIG. 5, the upper surface of fiber-rich portion 32 is substantially coplanar with the upper surface of raised portion 16, the upper surface of the analogous fiber-rich region 32 of the nonwoven fabric shown in FIG. 15 is in a plane which is above the plane of the upper surface of raised portion 16. This is a result of the provision in support member 128 of the pair of second recessed regions 125. In the nonwoven fabric of FIG. 15, the boundary between fiber-rich region 32 of transition region 24 and the raised portion 16 is more distinct and more visually apparent than in the case of the nonwoven fabric of FIG. 5. Additional recessed regions in the support member will provide additional raised portions in the fabric. Multiple recessed surfaces may be provided in the support member, as desired, to create further corresponding raised portions in the nonwoven fabric. It will be apparent that, in accordance with the teachings of the present invention, a support member can be provided which can be used to produce a modified version of the nonwoven fabric of FIG. 15 wherein the central region of raised portion 16 carries a further raised portion projecting upwardly from the upper surface thereof.

Referring again to FIG. 1B, there is shown a nonwoven fabric having a raised portion 18 in the form of a rectangle. As already mentioned, the basis weight of raised portion 18 is greater than that of background portion 12. The nonwoven fabric of FIG. 1B can be made on a modification of support member 128 shown in FIG. 14B. Such modified support member would comprise recessed region 125 arranged in the form of the desired rectangle but would not, however, include recessed region 121 or its recessed surface 124.

Figure 16:
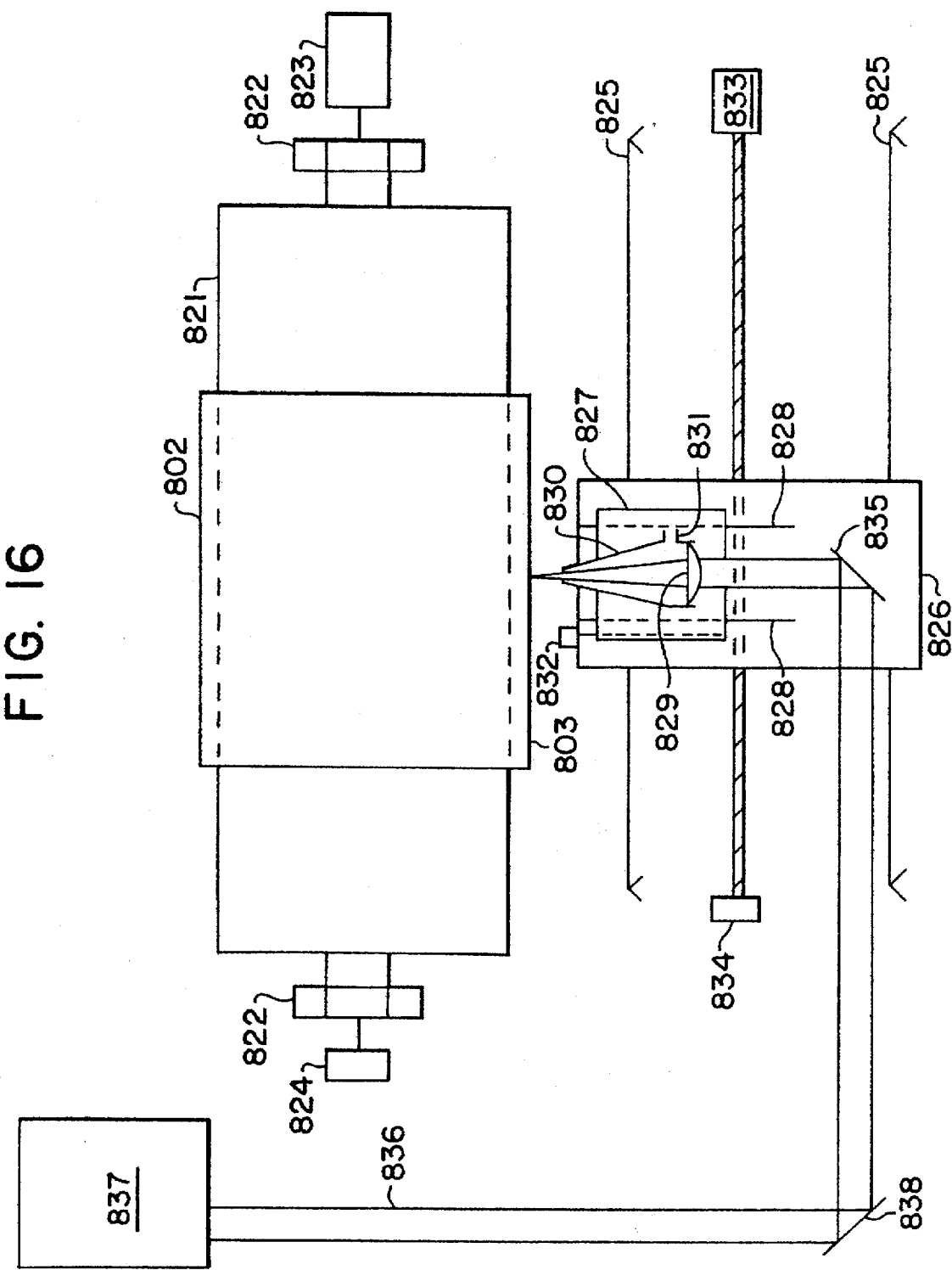
FIG. 16 is a diagrammatic view of an apparatus for forming topographical support members of the present invention.

Topographical support members of the present invention may be produced by processing a precursor support member workpiece having any desired topographical configuration on the apparatus shown in FIG. 16.

The desired precursor workpiece is mounted on an appropriate arbor, or mandrel 821 that fixes it in a cylindrical shape and allows rotation about its longitudinal axis in bearings 822. A rotational drive 823 is provided to rotate mandrel 821 at a controlled rate. Rotational pulse generator 824 is connected to and monitors rotation of mandrel 821 so that its precise radial position is known at all times.

Parallel to and mounted outside the swing of mandrel 821 is one or more guide ways 825 that allow carriage 826 to traverse the entire length of mandrel 821 while maintaining a constant clearance to the top surface 803 of tube 802. Carriage drive 833 moves the carriage along guide ways 825, while carriage pulse generator 834 notes the lateral position of the carriage with respect to support member 802. Mounted on the carriage is focusing stage 827. Focusing stage 827 is mounted in focus guide ways 828 and allows motion orthogonal to that of carriage 826 and provides a means of focusing lens 829 relative to top surface 803. Focus drive 832 is provided to position the focusing stage 827 and provide the focusing of lens 829.

Secured to focusing stage 827 is the lens 829, which is secured in nozzle 830. Nozzle 830 has means 831 for introducing a pressurized gas into nozzle 830 for cooling and maintaining cleanliness of lens 829.

Also mounted on the carriage 826 is final bending mirror 835, which directs the laser beam 836 to the focusing lens 829. Remotely located is the laser 837, with optional beam bending mirrors 838 to direct the beam to final beam bending mirror 835. While it would be possible to mount the laser 837 directly on carriage 826 and eliminate the beam bending mirrors, space limitations and utility connections to the laser make remote mounting far preferable.

When the laser 837 is powered, the beam 836 emitted is reflected first off beam bending mirror 838, then final beam bending mirror 835, which directs it to lens 829. The path of laser beam 836 is configured such that, if lens 829 were removed, the beam would pass through the longitudinal center line of mandrel 821.

When focusing lens 829 passes beam 836, it concentrates the energy near the center of the beam. The rays are not bent through a single point, but rather a spot of small diameter. The point of smallest diameter is said to be the focus or focal point. This occurs at a distance from the lens said to be the focal length. At lengths either shorter or greater than the focal length, measured spot sizes will be greater than the minimum.

A precursor support member comprising a predetermined topography and a predetermined pattern of openings therein is prepared or otherwise obtained. One support member which is suitable as such a precursor is disclosed in FIG. 3 of U.S. Pat. No. 5,098,764. This support member, identified by numeral 56 in FIG. 3 of the '764 patent, comprises rows of pyramids 61 whose apices 65 are aligned in two directions perpendicular to each other. These pyramids have "sides" 66 and the spaces between the pyramids are called "valleys" 67. This support member also includes a plurality of holes or apertures 68 disposed in a pattern and extending through the thickness of the support member. Several other topographical support members are disclosed in U.S. Pat. No. 5,098,764 and all of these support members are suitable precursors for use in making support members for practicing the present invention. Precursor support members must be constructed of materials which are suitable for processing by laser ablation; acetal or acrylic materials are preferred materials of construction. Specifics of the laser processing of polymeric materials have been disclosed in commonly assigned co-pending U.S. patent application Ser. No. 08/307,203, filed Sep. 16, 1994, now U.S. Pat. No. 5,585, 017 the title of which is "Defocused Laser Drilling Process For Making Fabric Forming Device" and the disclosure of which is hereby incorporated by reference.

The support member illustrated in FIG. 13 of the accompanying drawings is used as the precursor topographical support member from which is prepared a support member for making nonwoven fabric 10C shown in FIG. 1C of the accompanying drawings. This precursor support member is disclosed in FIG. 5 of copending U.S. patent application Ser. No. 131,191, filed Sep. 13, 1993, pending the title of which is "Tricot Nonwoven Fabric" and the disclosure of which is hereby incorporated by reference. As disclosed in the aforementioned application, this particular support member can be used to make nonwoven fabrics with a tricot-like surface appearance.

The process for laser drilling a precursor support member to provide a support member of the present invention which can be used to produce nonwoven fabric 10C of FIG. 1C will now be described. An initial focusing step must be performed. The precursor support member shown in FIG. 13 is positioned on the mandrel 821, and the carriage drive 833 is motored to place the focal point of the lens 829 in a non-drilled portion of the starting tube from which the precursor support member was originally made. Typically, non-drilled portions are provided as a margin at each end of the support member; these non-drilled portions provide not only areas for trial engraving but also function as a reinforcing means, thus providing structural integrity to the support member. The laser is pulsed briefly and the mandrel rotated slightly between pulses such that a series of small depressions is provided.

The focus stage 827 is then moved with respect to the mandrel center line to change the focus position and another series of depressions is produced. Typically a matrix of 20 columns of 20 depressions each is drilled, with the focus stage being repositioned inbetween each pair of columns. The depressions are examined microscopically, and the column of smallest depressions is identified. The position of the focus stage 827 that produced this column of smallest diameter depressions defines the reference diameter for the precursor support member top surface 103 at which the beam is focused.

Figure 17B:
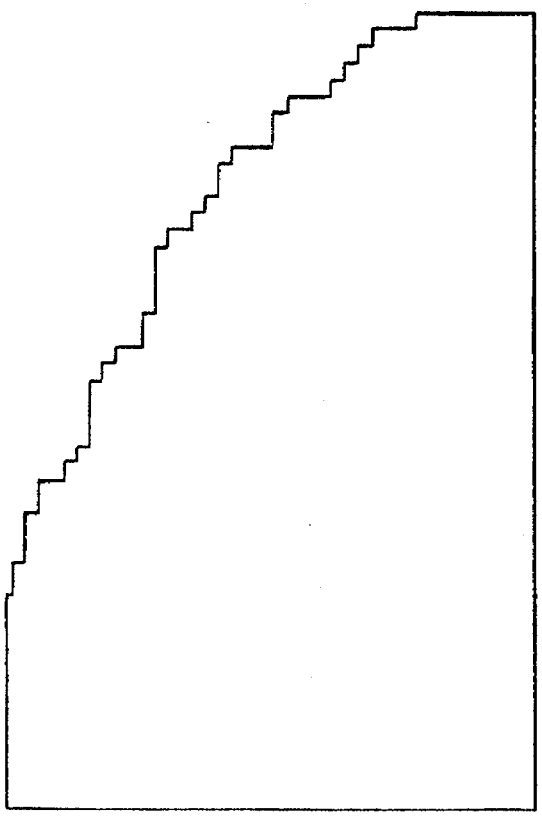
FIG. 17B is a bit map, greatly enlarged, of the rectangular region 301 of FIG. 17A.
Figure 17A:
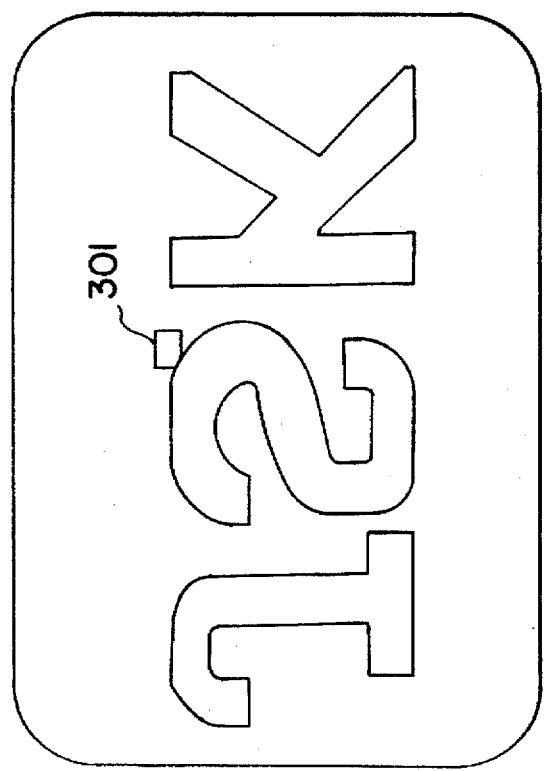
FIG. 17A is a bit map of the pattern used to create the support member used to produce the nonwoven fabric 10C of FIG. 1C.

A desired pattern is selected, such as that in FIG. 17A. FIG. 17A is a bit map of the pattern used to create the support member which was ultimately used to produce the nonwoven fabric 10C of FIG. 1C. FIG. 17B is a bit map, greatly enlarged, of the rectangular region 301 of FIG. 17A. As can be seen in FIG. 17B, the curved portion of the mirror image of the letter "S" is not a smooth curve, but rather a series of tiny stepped squares, or "pixels". Each of these pixels corresponds to a region on the surface of the precursor support member to be engraved. The typical dimension of the support member surface corresponding to one pixel is 0.002 inch in each direction. The pixels that are colored black correspond to regions that will be a depressed region in the final support member, that is, regions where the laser will be turned on to remove material by ablation. The pixels that are white correspond to regions of the support member that should remain unaltered by this process, and consequently are regions where the laser will be turned off. In this manner the pattern of FIG. 17A encodes the laser operating instructions to produce the image in the support member.

The pattern must be adjusted to produce an image of the intended size. If, for example, a depressed feature in the support member is desired with a length of one inch, and the above-mentioned scale is employed, the bit map must be created with that image being 500 pixels long.

A position is then selected for the first depressed region to be created in the precursor support member. This must be defined for both the longitudinal position (across the face of the precursor support member) and the circumferential position (around the circumference of the precursor support member). This starting position corresponds to the top left corner of the bit map in FIG. 17A of the accompanying drawings. Columns of pixels in the bit map correspond to regions disposed around the circumference of the precursor support member. Rows of pixels in the bit map correspond to regions disposed across the face of the precursor support member.

If more than one depressed region is desired in the final support member, the initial corner location is established for each such depression. If desired, the computer control system can be configured such that the number of repeats of a pattern in each direction (longitudinal and circumferential ) can be specified, and the computer will determine the starting points for each of these repeats. Within each depressed region the operation is duplicated.

In operation, the carriage is initially motored so that the focal point of the lens corresponds to the longitudinal position of the previously determined position of the first depression. This position is established by the carriage pulse generator 834.

The mandrel is now made to rotate at a constant speed. Circumferential position is established by rotational pulse generator 824. The actual rotational speed used will depend on the laser power, desired depth of cut, laser spot size and carriage advance per revolution. Once the mandrel is at operating speed, the computer examines the left-most column of the bit map for laser instructions. If this column has no black pixels, the laser will remain off for the entire first revolution of the mandrel. If there are black pixels in the first column, the laser will be switched on when the positions on the support member corresponding to black pixels are positioned at the focal point of the lens. The encoded instructions in this left-most column result in repeated laser operation around the circumference of the support member in each of the regions specified to have the pattern repeated.

When a full revolution has been completed, the carriage drive repositions the focal point of the lens to the position of the next region of the precursor support member from which material is to be removed by laser ablation. This new location is directly over those regions of the precursor support member corresponding to the pixels in the second column of the bit map. The new location is verified by carriage pulse generator 834. The computer then examines the encoded instructions in the second column of the bit map, and pulses the laser on and off as instructed during the next mandrel revolution. This process is repeated until the entire pixel pattern in the bit map has been "burned" into the precursor support member.

Note that in the approach, each pass produces a number of narrow cuts in the material, rather than a large depression. Because these cuts are precisely registered to line up side-by-side and overlap somewhat, the cumulative effect is a broad depression. Production of a smooth image requires that the region established to correspond to an individual pixel in the design be smaller than the minimum laser spot size used. This provides overlap of adjacent passes resulting in subsequent blending of the edges of each pass, and thereby minimizing "jaggies". Though typically square, for some purposes, it is more convenient to employ pixels of unequal proportions. For example, rectangular pixels may be employed.

Recess depth is proportional to power, and inversely proportional to rotational speed and carriage advance per revolution. The cumulative effect of multiple passes is a wide recess, with blending of detail from overlapping passes. This process can be repeated as many times as a desired over the working face of the support member, creating large pattern effects.

If an accent recess is desired, a second pattern is created, identifying those pixels to be engraved to a different depth. These follow the same process, but use either a higher laser power or slower rotational speed to achieve increased depth.

There is a surprising and interesting aspect to the above-described laser ablation processing of a precursor support member. Unlike a lathe turning operation, which would remove material to a constant depth, the laser ablation process just described removes a fixed amount of material from the precursor support member. For example, in the process just described, the precursor support member comprised the topographical pattern shown in FIG. 13. The subsequent laser ablation process creates a recessed region corresponding to the mirror image of the letters "JSK". When a nonwoven fabric is made using the finished support member, the letters "JSK" appear in a raised portion of the fabric. This is seen in FIG. 16 where the letters "JSK" comprise first raised portion 16 of nonwoven fabric 10C. These raised letters "JSK" have the same tricot-like appearance as background portion 12.

EXAMPLE 1

This example shows the production of a topographical support member which can be used to produce nonwoven fabric 10C of FIG. 1C. The precursor topographical support member is made of acetal and has the topographical pattern of peaks, valleys and apertures shown in FIG. 13 of the accompanying drawings. The precursor topographical support member was made by the laser drilling process disclosed in commonly assigned copending U.S. patent application Ser. No. 08/307,203 filed Sep. 16, 1994, now U.S. Pat. No. 5,585,017 the title of which is "Defocused Laser Drilling Process For Making Fabric Forming Device" and the disclosure of which is hereby incorporated by reference. The support member of this Example 1 was made on the apparatus of FIG. 16 using the precursor support member just mentioned and the laser ablation process described hereinabove. The precursor support member was mounted on mandrel 821. The computer graphic file used to control the laser ablation process was that shown in FIG. 17A. The laser power was set to produce a constant output, when on, of 1320 watts. Lens 829 was a positive meniscus lens having a focal length of 5 inches. Lens 829 was focused at the top surface of the unengraved marginal portion of the precursor topographical support member. This coincides with the reference diameter established for the precursor support member as explained earlier herein. The rotational speed of mandrel 821 during the laser ablation process was 35 rpm, resulting in a support member top surface speed of 69 m/min. The carriage advance per revolution was 50 microns. The laser ablation process was continued until the entire peripheral surface of the precursor support member was laser engraved with the desired pattern. The resulting topographical support member comprised a first pattern nearer its outer surface and a second pattern beneath said first pattern, i.e., recessed into the depth of the support member. The first pattern in the resulting support member was the pattern illustrated in FIG. 13 of the drawings. The second pattern, i.e., the pattern recessed into the depth of the support member beneath the first pattern, was the pattern illustrated in FIG. 17A of the drawings.

EXAMPLE 2

This example illustrates the production of nonwoven fabric 10C shown in FIG. 1C using the topographical support member made in accordance with Example 1. The topographical support member of Example 1 was removed from mandrel 821 of the apparatus shown in FIG. 16 and was mounted on drum 90 of the apparatus shown in FIG. 12.

A fibrous web consisting entirely of staple-length cotton fibers and weighing 1.2 ounces per square yard was made by combining a 0.6 ounce per square yard 100% cotton web made by a conventional carding process and a 0.6 ounce per square yard 100% cotton web made by a conventional air laying process. In the specific example being discussed, the carded web and the air laid web were combined by positioning the air laid web on top of the carded web. It will be understood that the carded web could, if desired, be positioned on top of the air laid web.

The aforementioned 1.2 oz/sq yd 100% cotton web was lightly pre-entangled using a conventional flat-belt entangling apparatus comprising 18 orifice strips which were spaced from each other in the machine direction of the apparatus and which extended across the width of the apparatus. The diameter of the orifices was 0.007 inch. There were thirty (30) orifices/lineal inch in each orifice strip. The entangling fluid was water. In going from the upstream direction to the downstream direction, water was supplied to the first 3 orifice strips at 200 psig; to the next 3 orifice strips at 600 psig; and to the last 12 orifice strips at 1000 psig. The pre-entangling apparatus was operated at about 330 feet per minute (fpm). The thus processed cotton web was dried over steam cans to provide a lightly entangled 100% cotton web hereinafter called a "pre-bond".

Two plies of the above-described pre-bond were used to make nonwoven fabric 10C. The two-ply pre-bond was placed on the topographical support member of Example 1 which had been previously been mounted on mandrel 821. The two-ply pre-bond was then sprayed lightly with water. The distance from the bottom of the orifice strips of the apparatus shown in FIG. 12 to the top of the pre-bond material was about 0.75 inch. Only one of the five orifice strips 92 shown in FIG. 12 was used for the processing step. The two-ply pre-bond was passed once under the orifice strip at 100 yards per minute while water was being supplied to orifice strip at a pressure of about 600 psig. The pre-bond was then passed under the orifice strip eight additional times. The line speed employed during these eight passes was 100 yards per minute with water being supplied to the orifice strip at a pressure of about 1600 psig. Nonwoven fabric 10C thus produced was vacuum de-watered, removed from the support member, and dried in a hot air oven.

It will be understood that nonwoven fabric 10C comprised a background portion 12 having a tricot-like appearance which resulted from the first pattern comprising the support member, said first pattern corresponding to that shown in FIG. 13 of the drawings. Raised portion 16 of the nonwoven fabric 10C resulted from the pattern of FIG. 17A.

Further details respecting nonwoven fabrics of the kinds disclosed herein are found in commonly assigned copending U.S. patent application Ser. No. 08/308,001, pending filed Sep. 16, 1994, the title of which is "Nonwoven Fabrics Having Raised Portions", and the disclosure of which is hereby incorporated by reference.

Basis weight is determined as follows. The material to be tested is conditioned for at least 6 hours at 70° F. and a relative humidity of 65%. Three individual test specimens are die cut from the desired part of the conditioned material using a die punch of known, pre-determined area. This area is on the order of 30 square millimeters. Each die cut test specimen is weighed on an analytical balance. The basis weight of each individual test specimen is calculated by dividing its weight by its known area. The basis weight is reported as the average of the basis weights of the three test specimens.

While several embodiments and variations of the present invention are described in detail herein, it should be apparent that the disclosure and teachings of the present invention will suggest many alternative designs to those skilled in the art.

What is claimed is:

1. A topographical support member for producing a nonwoven fabric comprising:
   a) a body having a top surface including a first micro-sized topographical pattern;
   b) a pattern of apertures extending through said body, each of said apertures having a conical top portion and the center line to center line spacing of adjacent apertures being less than the major diameter of the conical top portion of each adjacent aperture; and
   c) at least one macro-sized region of said body recessed below said top surface.

2. The support member of claim 1 wherein said at least one macro-sized region has a second micro-sized topographical pattern on a top surface of said region.

3. The support member of claim 2 wherein said first and second topographical patterns are the same pattern.

4. The support member of claim 1 wherein said at least one macro-sized region includes a major surface recessed a first depth below the top surface and one or more minor surfaces recessed at depths different from said first depth.

5. The support member of claim 4 wherein said macro-sized region includes one minor surface surrounding said major surface, said minor surface being recessed at a depth below said first depth, the width of said minor surface being substantially less than the width of said major surface.

6. The support member of claim 1 wherein said first micro-sized topographical pattern includes a pattern of a plurality of peaks and valleys, each of said apertures being surrounded by a cluster of said peaks and valleys.

7. The support member of claim 1 wherein said pattern of the plurality of peaks, valleys and apertures being configured to produce a nonwoven fabric with the appearance of tricot.

8. The support member of claim 6 wherein said at least one macro-sized region includes a pattern of a plurality of peaks and valleys surrounding each aperture which is the same as said first micro-sized topographical pattern.

9. The support member of claim 1 wherein said first topographical pattern includes a repeating pattern of peaks and valleys and wherein the cross-sectional width of said macro-sized region is greater than the spacing between the repeat of said repeating pattern.

10. The support member of claim 1 wherein said pattern of apertures is a matrix and wherein the cross-sectional width of said macro-sized regions is greater than the spacing between the apertures in said matrix.

11. The support member of claim 1 wherein said first topographical pattern includes a repeating pattern of peaks and valleys and wherein the cross-sectional width of said macro-sized region is at least two times greater than the spacing between the repeat of said repeating pattern.

12. The support member of claim 1 wherein said pattern of apertures is a matrix and wherein the cross-sectional width of said macro-sized region is at least two times greater than the spacing between the apertures in said matrix.

* * * * *